United States Patent [19]

Freeman

[11] Patent Number: 4,591,664
[45] Date of Patent: May 27, 1986

[54] MULTICHANNEL INTERACTIVE TELEPHONE ANSWERING APPARATUS

[76] Inventor: Michael Freeman, 31 Cornwall La., Sands Point, N.Y.

[21] Appl. No.: 443,961

[22] Filed: Nov. 23, 1982

[51] Int. Cl.⁴ .............................................. H04M 1/64
[52] U.S. Cl. ................................... 179/6.06; 179/6.16
[58] Field of Search ................... 179/6.01, 6.02, 6.03, 179/6.06, 6.11, 6.13, 6.14, 6.16, 6.08, 7.1 TP; 360/12

[56] References Cited

U.S. PATENT DOCUMENTS

| | | | |
|---|---|---|---|
| 3,445,601 | 5/1969 | Whitely et al. | 179/6.02 |
| 3,793,487 | 2/1974 | Kilby | 179/6.07 |
| 4,011,411 | 3/1977 | Nishimura | 179/6.08 X |
| 4,072,986 | 2/1978 | Heidergren | 360/12 |
| 4,122,306 | 10/1978 | Friedman et al. | 179/6.06 |
| 4,194,089 | 3/1980 | Nashimoto | 179/6.08 |
| 4,320,256 | 3/1982 | Freeman | 179/6.04 |
| 4,371,752 | 2/1983 | Matthews et al. | 179/7.1 TP |
| 4,387,282 | 6/1983 | Castro et al. | 179/6.03 |

Primary Examiner—Aristotelis M. Psitos
Attorney, Agent, or Firm—Stiefel, Gross, Kurland & Pavane

[57] ABSTRACT

A multichannel interactive telephone answering apparatus (300) adapted for use with a captured telephone line (26) is responsive to the detection (318, 324, 326, 310, 328, 330) of designated arming signals transmitted by the calling party, such as from the keypad of a Touch-Tone phone, for enabling multiple and/or restricted messages to be provided and/or recorded and/or user and caller selectable screening and/or directing of calls. This can be used to direct or screen calls to a particular telephone extension in the home or to record and/or playback private messages. The apparatus (300) employs a multitrack playback apparatus (302, 304, 306) having a main channel (302) and at least one auxiliary channel (304) which are selected in response to detection of the appropriate arming signal which, when detected, activates the channel switching logic (310) to select the appropriate channel which, for example, thereafter provides prerecorded messages to the caller and/or tones to direct calls to the appropriate extension.

14 Claims, 17 Drawing Figures

BLOCK DIAGRAM

FIG. 2 *LINE CAPTURE AND RELEASE*

MOTOR CONTROL

TOUCH-TONE DECODER

TRACK AND CHANNEL SELECTION (TYPICAL)

PLAYBACK AUDIO SYSTEM

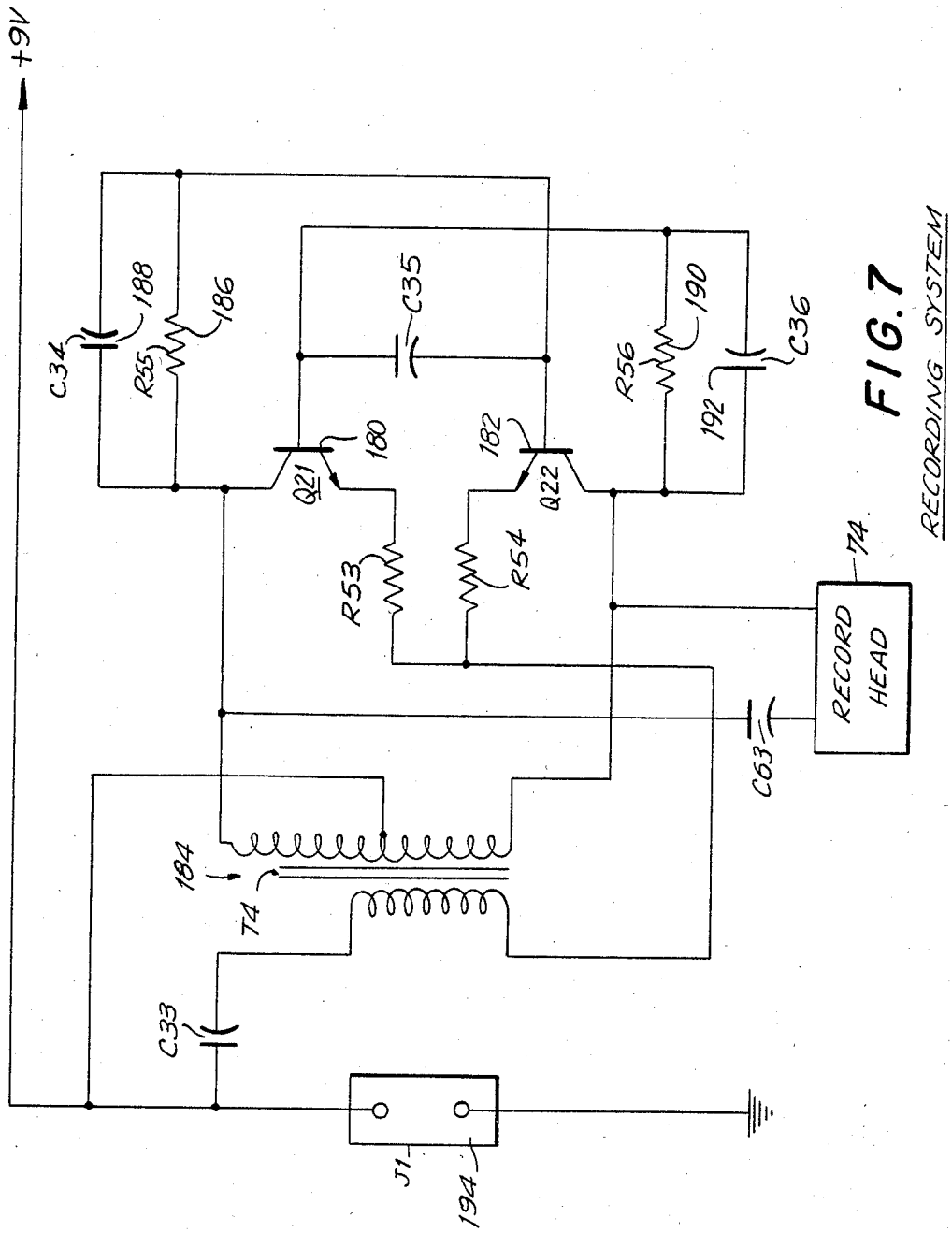

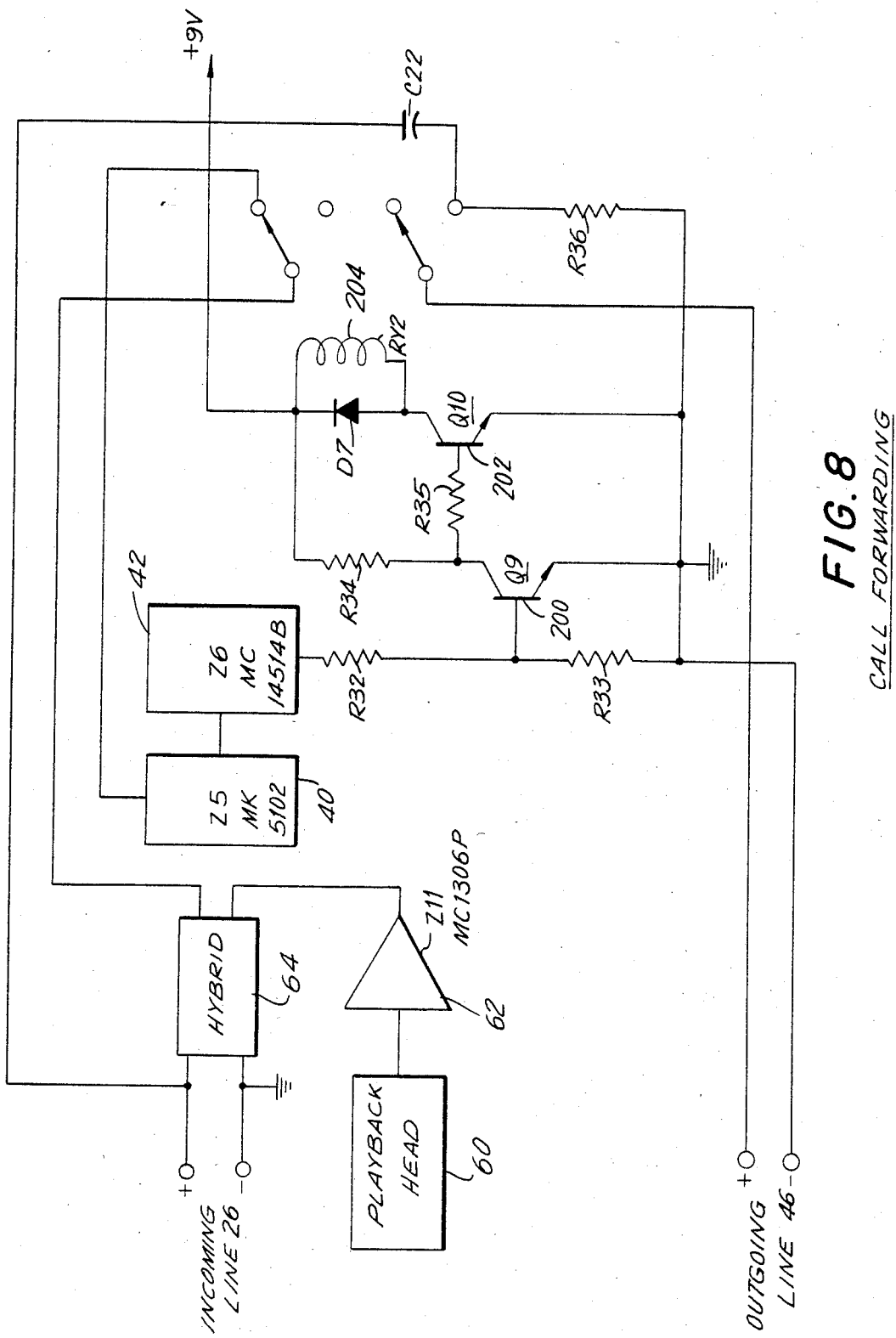
FIG. 8 CALL FORWARDING

CONCEPTUAL DECISION TREE
FOR EXAMPLE 1

CONCEPTUAL DECISION TREE
FOR EXAMPLE 2

CONCEPTUAL DECISION TREE
FOR EXAMPLE 3

MULTICHANNEL INTERACTIVE TELEPHONE ANSWERING APPARATUS

CROSS-REFERENCE TO RELATED APPLICATIONS

This application is a continuation-in-part of my copending U.S. patent application Ser. No. 295,817, entitled "Interactive Telephone Answering System", filed Aug. 24, 1981, now U.S. Pat. No. 4,420,656, which is in turn, a continuation-in-part of my U.S. patent application Ser. No. 97,687, entitled "Verbally Interactive Telephone Interrogation System" With Selectible Variable Decision Tree, filed Nov. 27, 1979 now U.S. Pat. No. 4,320,256 and is related to my U.S. Pat. Nos. 3,957,972; 4,078,316; 4,264,924 and 4,264,925, the contents of all of which are specifically incorporated by reference herein in their entirety.

TECHNICAL FIELD

The present invention relates to a telephone answering apparatus and particularly to such an apparatus capable of interactively providing caller-selectable multiple messages and/or user and caller selectable servicing and/or directing of an incoming call for individual telephones as well as multiple telephone extensions.

BACKGROUND ART

Telephone systems, such as Touch-Tone system or dial systems, are well-known and extend throughout the United States. Such systems have been used for normal telephone conversations and as Data Sets but have not, to applicant's knowledge, achieved their full utilization as a communications interface, such as achieved by the present invention and the invention described and claimed in my U.S. patent application Ser. Nos. 97,687, filed Nov. 27, 1979 and entitled "Verbally Interactive Telephone Interrogation System" With Selectible Variable Decision Free, now U.S. Pat. No. 4,320,256, and Ser. No. 295,817, filed Aug. 24, 1981 and entitled "Interactive Telephone Answering System", now U.S. Pat. No. 4,420,656, in which the Touch-Tone type telephone is utilized to transmit unique signals over a captured telephone line to provide a verbally interactive telephone interrogation system, or to provide an interactive telephone answering system capable of caller selectable routing of an incoming call to a desired receiving telephone in accordance with a verbally interactive prerecorded decision tree format as in the aforementioned copending patent applications. Moreover, such telephone answering systems have previously employed telephone answering machines, such as in the home which are of severally limited capability and do not, to applicant's knowledge, readily and efficiently, allow the user to provide multiple information messages which can be remotely selected by a specified caller having knowledge of a selection code, or which readily allow a user to provide for selective call screening or directing via the telephone answering machine or apparatus to easily provide these sophisticated features for a simple home multiple telephone extension system merely through use of the telephone answering apparatus of the present invention. This is so despite the widespread knowledge of prior art interrogation systems, or multiple choice selectible response systems, such as exemplified by the prior art cited in the aforementioned copending patent applications; namely U.S. Pat. Nos. 4,194,089; 3,947,972; 4,078,316; 3,950,618; 4,153,370; 3,651,471; 4,008,369; 4,216,497; 4,107,735; 3,906,450; 2,674,512; 3,744,712; 3,744,712; 3,776,453; 4,023,729; 3,974,335; 3,584,142; 3,654,708; 3,668,312; 3,729,581; 2,777,901; 3,194,895; 3,245,157; 3,273,260; 3,255,536; 3,284,923; 3,477,144; 3,484,950; 3,538,621; 3,5646,791; 3,623,238; 3,665,615; 3,708,891; 3,763,577 and 3,774,316. The aforementioned systems also include broadcast audience poll systems such as disclosed in U.S. Pat. Nos. 2,674,512; 3,744,712; 3,776,453; 3,974,335; 4,023,729 and 3,950,618. Moreover, automatic telephone answering systems employing multitrack prerecorded messages in a fixed format are known, such as disclosed in U.S. Pat. No. 4,194,089, however such prior art systems are not truly interactive telephone answering systems capable of enabling caller selectable routing of an incoming call to a desired receiving telephone in accordance with a verbally interactive prerecorded decision tree format, merely providing for the recording of messages by the caller and the reception of prerecorded messages by that caller, and moreover do not provide a caller selectable multiple information message capability. Thus, for example, none of the prior art systems known to applicant is a verbally interactive telephone answering system enabling caller selectable routing of an incoming call to a desired receiving telephone in accordance with a verbally interactive prerecorded decision tree format, such as a system in which the caller may pass through a verbally interactive decision tree process before indicating which telephone extension the caller desires to be connected to, with this extension being automatically rung due to a prerecorded arming signal, or with the call being automatically forwarded due to prerecorded dialing codes located on the verbally interacitve multitrack tape. In addition, although conventional telephone answering machines enable the owner to listen to the incoming message as it is being recorded, there are no such systems known to applicant which enable call screening in a variable decision tree format such as utilized in the present invention. Moreover, although two-way communication systems have become popular for purposes of polling or interrogation, such as the cable TV system known as QUBE, these prior art systems are not individualized verbally interactive systems nor do they enable caller selectable routing of incoming calls in accordance with a verbally interactive prerecorded decision tree format. Moreover, although message routing networks are well known, such as for example, the systems disclosed in U.S. Pat. Nos. 1,458,180; 1,556,727; 1,569,727; 2,430,205; 3,300,771; and 3,686,630, these systems do not employ a telephone answering apparatus having the capabilities of the present invention for controlling interactive communication.

These disadvantages of the prior art are overcome by the present invention.

DISCLOSURE OF THE INVENTION

A multichannel interactive telephone answering apparatus is provided which is adapted for use with a two-way telephone line after capture thereof for enabling interactive communication over the telephone line so as to enable the caller, providing the appropriate interactive response to prerecorded information messages, to select between multiple information channels of the answering apparatus thereby enabling such features as call directing or screening or multiple message selection and/or personalized message storage for user playback. In order to accomplish the above, a multichannel information storage means, such as a multitrack cassette or tape, is provided, which is capable of retrievably storing the information for enabling the aforementioned interactive communication. The multichannel storage means comprises at least a main information channel and auxiliary information channel, although more than one auxiliary information channel can be provided. A channel selection circuit is provided for selectively switching at least between the main information channel and the auxiliary information channel and includes signal detection means for detecting a designated arming signal, such as a Touch-Tone provided by the caller over the captured telephone line or a dial pulse code provided by the caller or a voice recognition signal provided by the caller or a particular designated frequency provided by the caller or any other desired type of uniquely recognizable signal provided by the caller over the captured telephone line. The channel selection circuit provides an enable signal in response to detection of the designated arming signal which enable signal is used to operate a swtich in response thereto for providing the aforementioned provided channel switch. The multichannel information storage means preferably comprises both playback and recording circuitry associated with each of the channels for providing selective playback of the information stored in the selected channel in response to the selection of a selected one of the channels as well as for providing selective recording of information by the user, such as screening or call directing information as well as for recording messages provided by the caller over the captured telephone line. The selected playback and recording cooperate to provide the interactive communication. The multichannel storage means preferably provides playback from the main information channel in the absence of the detection of the designated arming signal which may be varied at the will of the user. The aforementioned recording portion of the telephone answering apparatus of the persent invention perferably includes circuity for generating a different trigger signal to be stored on each of the main and auxiliary channels with the telephone answering apparatus including trigger signal detection circuitry for detecting the trigger signal and for generating a selective alert signal, such as a unique ringing signal, for the user only in response to detection of the trigger signal so as to provide call screening and/or directing for the user. Thus, in a multiple telephone extension situation, unique ringing signals may be provided for each of the different telephone extensions so that the user will know which extension is to be answered. This becomes particularly beneficial in the home where each extension can be associated with a particular desired recipient for the incoming call. By the use of the main channel and auxiliary channels, selectable different messages for playback to the user designated caller may be provided for such as by providing a unique code as the arming signal for selection of a particular message stored on a given auxiliary channel while allowing all callers to hear the messages stored on the main channel. In this matter, a particular designated caller can also leave responsive messages on a designated auxiliary channel thereby, in essence, providing a personalized telephone answering message channel for a caller or group of callers designated by the user which all other callers do not have access to. Thus, the telephone answering apparatus of the present invention may be used with any type of telephone system, providing appropriate modifications are made, such as a Touch-Tone system, or a conventional dial system or a system in which voice recognition is employed, by way of example. Moreover, such a telephone answering apparatus can be employed in the interactive telephone answering system described in my copending U.S. patent application Serial No. 295,817, entitled "Interactive Telephone Answering System", filed Aug. 24, 1981, now U.S. Pat. No. 4,420,656, of which this application is a continuation-in-part.

For purposes of completeness, the interactive telephone answering system of my aforementioned copending U.S. patent application Ser. No. 295,817, now U.S. Pat. No. 4,420,656, shall also be described herein. This interactive telephone and answering system is connectable to a capturable telephone line and responsive to unique signals transmitted over the telephone line after capture thereof, such as from a conventional Touch-Tone telephone, for enabling caller selectable routing of an incoming call to a desired receiving telephone in accordance with a verbally interactive prerecorded decision tree format is provided. The system includes a line capture and release portion responsive to an incoming telephone call for initially capturing the telephone line and providing a message start signal to a multitrack message reproduction apparatus, such as one employing a continuous loop type cartridge, such as an endless loop cassette or an eight-track tape. The multitrack tape device is connectable to the line capture network for selectively transmitting prerecorded audio messages to the caller over the captured telephone line and is capable of providing a plurality of different selectable audio messages in a variable decision tree format, with at least one of the selectable tracks in the decision tree format comprising an arming signal, such as a ringing tone, associated with an ultimate branch of a caller selectable decision tree. Each of the caller selectable decision trees comprises a primary interrogatory audio message, such as one which is common to a plurality of different caller selectable decision trees having different ultimate branch responses, and a time related derivative ultimate branch response comprising the aforementioned arming signal. The ultimate branch response may be arrived at through a series of derivative secondary interrogatory messages comprising the various caller selectable decision trees with the derivative secondary interrogatory messages being chain linked in content to a particular primary interrogatory message or the previous derivative secondary interrogatory message for forming the caller selectable decision tree for ultimately directing the telephone caller to the ultimate branch on the selected decision tree.

The continuous loop type cartridge preferably comprises a plurality of coextensive audio tracks having the various audio messages and ultimate branch responses stored thereon for selectable audio playback therefrom over the captured telephone line for the audio messages and for provision of the arming signal when the ultimate branch response is obtained Each of the plurality of tracks has a unique associated track selection signal corresponding to one of the unique signals transmitted over the captured telephone line. A signal discriminator and track selection network, such as one employing a tone decoder for converting the Touch-Tone signals into digital control signals, is operatively connected between the line capture network and the multitrack tape recorder for enabling reception of the unique signals or tones transmitted over the captured telephone line and selection of the appropriate one of the plurality of tracks for playback in response to reception and discrimination of the unique tone signal corresponding thereto.

A telephone connection network, such as one employing relays, is operatively connected between the line capture and release network and the multitrack tape recorder for connecting the captured telephone line to the receiving telephone in response to detection of the arming signal associated with the ultimate caller selectable branch. As such, the telephone connection network releases the captured telephone line from the multitrack tape recorder to the receiving telephone in response to detection of the arming signal with the captured telephone line then being released when the receiving telephone is placed on hook. Call-forwarding may be accomplished in the present invention by prerecording the dialing code of the number to which the call is to be forwarded as the ultimate branch response, with the caller providing a unique signal corresponding to a dial tone prior to the prerecorded dialing code being provided to a conventional call forwarding dialer. The telephone connection network may include a plurality of relays with one relay being associated with each track or possible telephone extension so that the caller may, either through the decision tree of prerecorded messages or by knowledge of the particular arming signal associated with a given telephone extension, be directly connected to the telephone extension of the desired receiving party. Thus, for example, if an eight-track tape were employed, eight relays could be employed for enabling selective connection of up to eight different telephone extensions, with the associated tone signal being decoded by the tone decoder so as to provide a digital control signal for arming the associated relay. The receiving party could, if desired, provide a secure system for receiving calls by changing the code for activating the relay or ringing generator to a different combination of tones required to provide the necessary digital control signal to ring forward to the desired extension or receiving telephone.

The owner of the telephone answering system can create interactive tone responsive telephone answering multitrack tapes on a multitrack continuous loop magnetic storage medium by recording each channel or track in a specially created timed-sequenced manner so as to make each information segment on each track coextensive and related in content, spatially in real time to the audio information segments recorded initially on the first recorded audio track in a decision tree format, with a ringing tone or arming signal being recorded at the end of each recorded audio message information segment for enabling ring tone generation upon selection of an ultimate branch in the decision tree. In addition, a call forwarding dialing code corresponding to a call forwarding telephone number could be recorded on one of the tracks in place of the ringing tone for enabling call forwarding to a remote telephone.

Thus, a caller responsive verbally interactive telephone phone call routing system may be provided in which the caller, through a verbally interactive prerecorded decision tree, may either be connected to a desired telephone extension within the internal telephone system of the receiving party or may have the call ultimately forwarded to a remote telephone. In addition, a receiving party may establish a secure telephone system so as to prescreen, in a verbally interactive environment, all incoming calls.

BRIEF DESCRIPTION OF THE DRAWINGS

FIG. 7 is a schematic diagram of the recording portion of the system of FIG. 1;

FIG. 8 is a schematic diagram of the call-forwarding control portion of the system of FIG. 1;

BEST MODE FOR CARRYING OUT THE INVENTION

Figure 12:
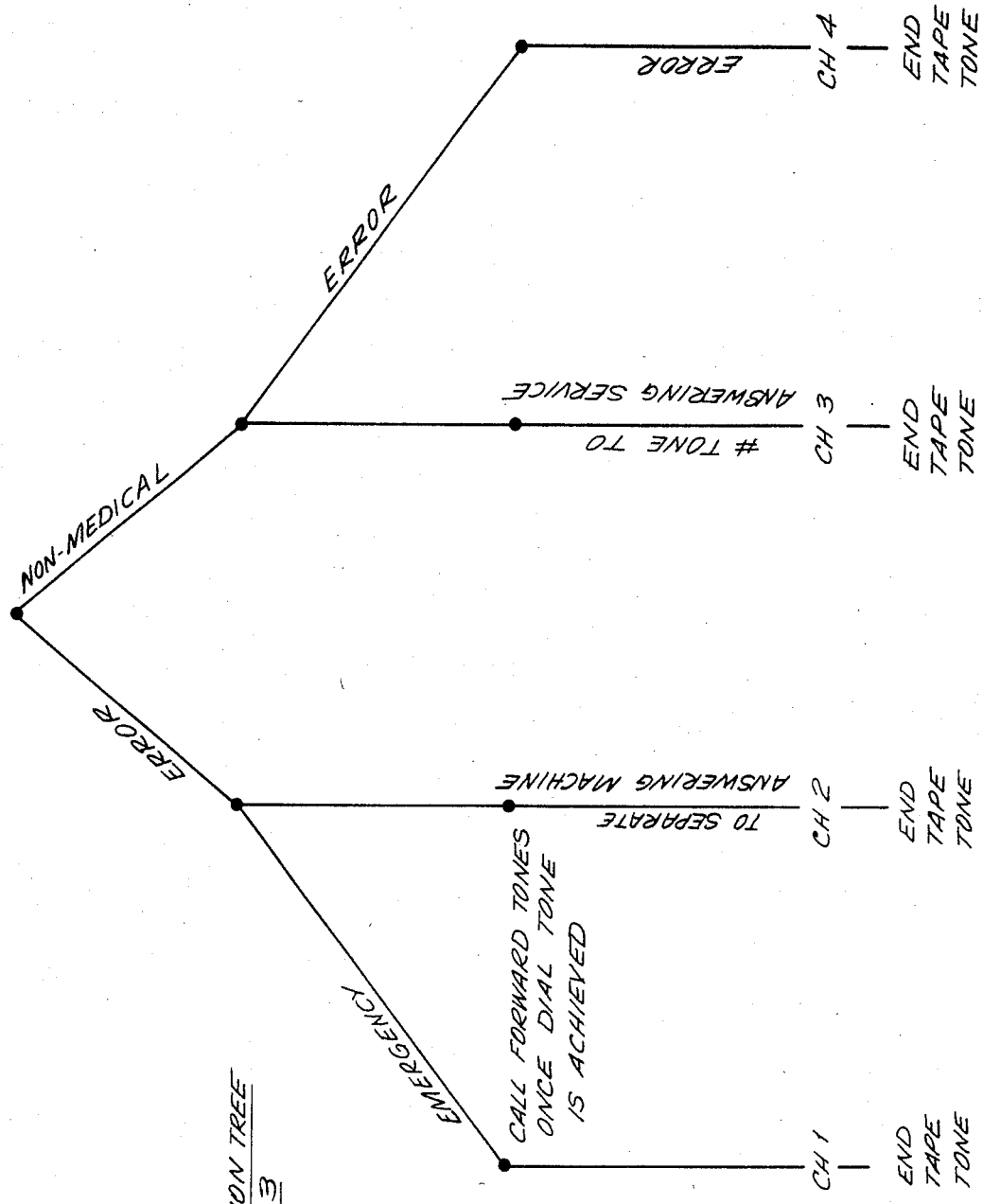
Figure 13:
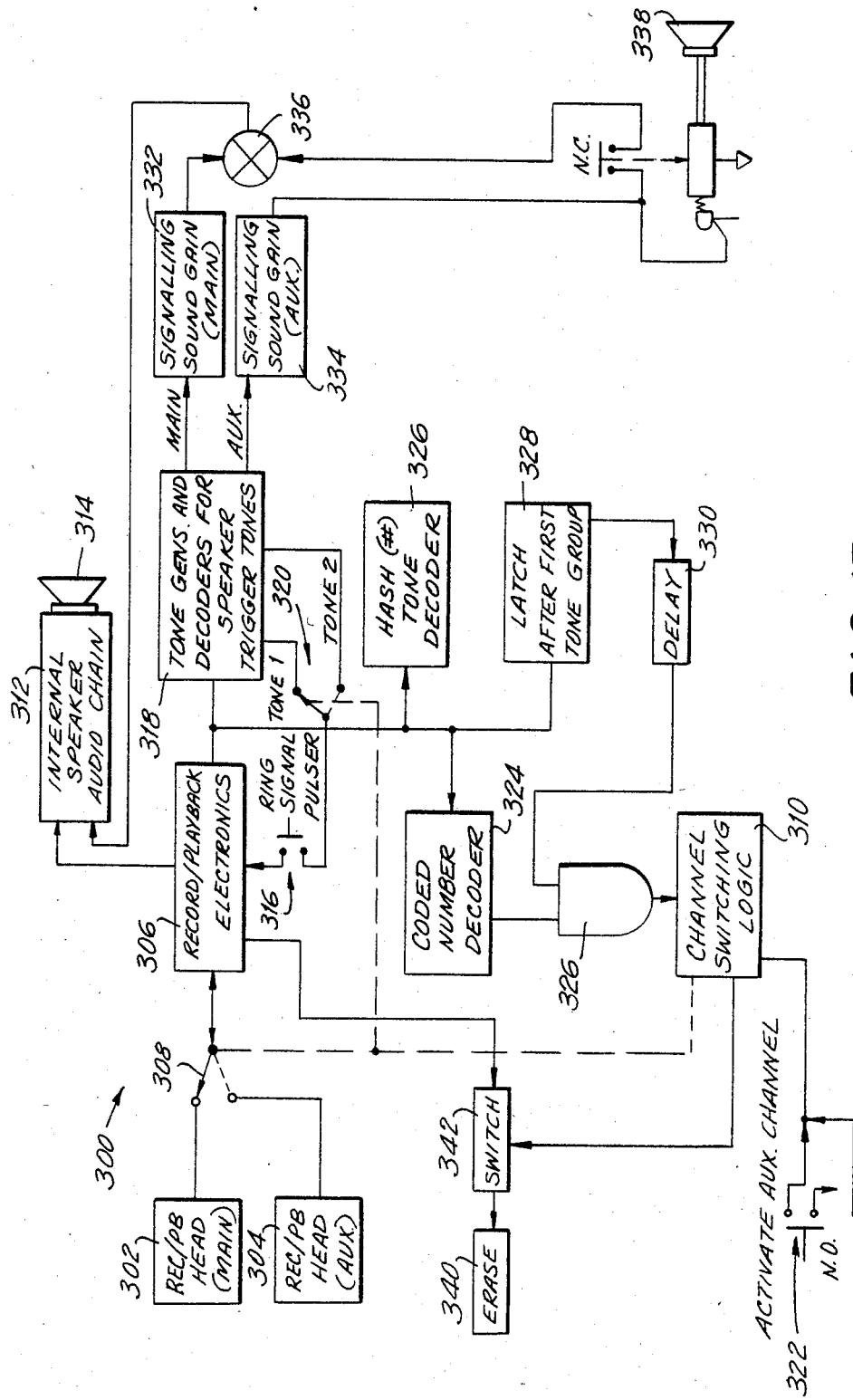
FIG. 13 is a functional block diagram of the presently preferred multichannel telephone answering apparatus of the present invention.
Figure 14:
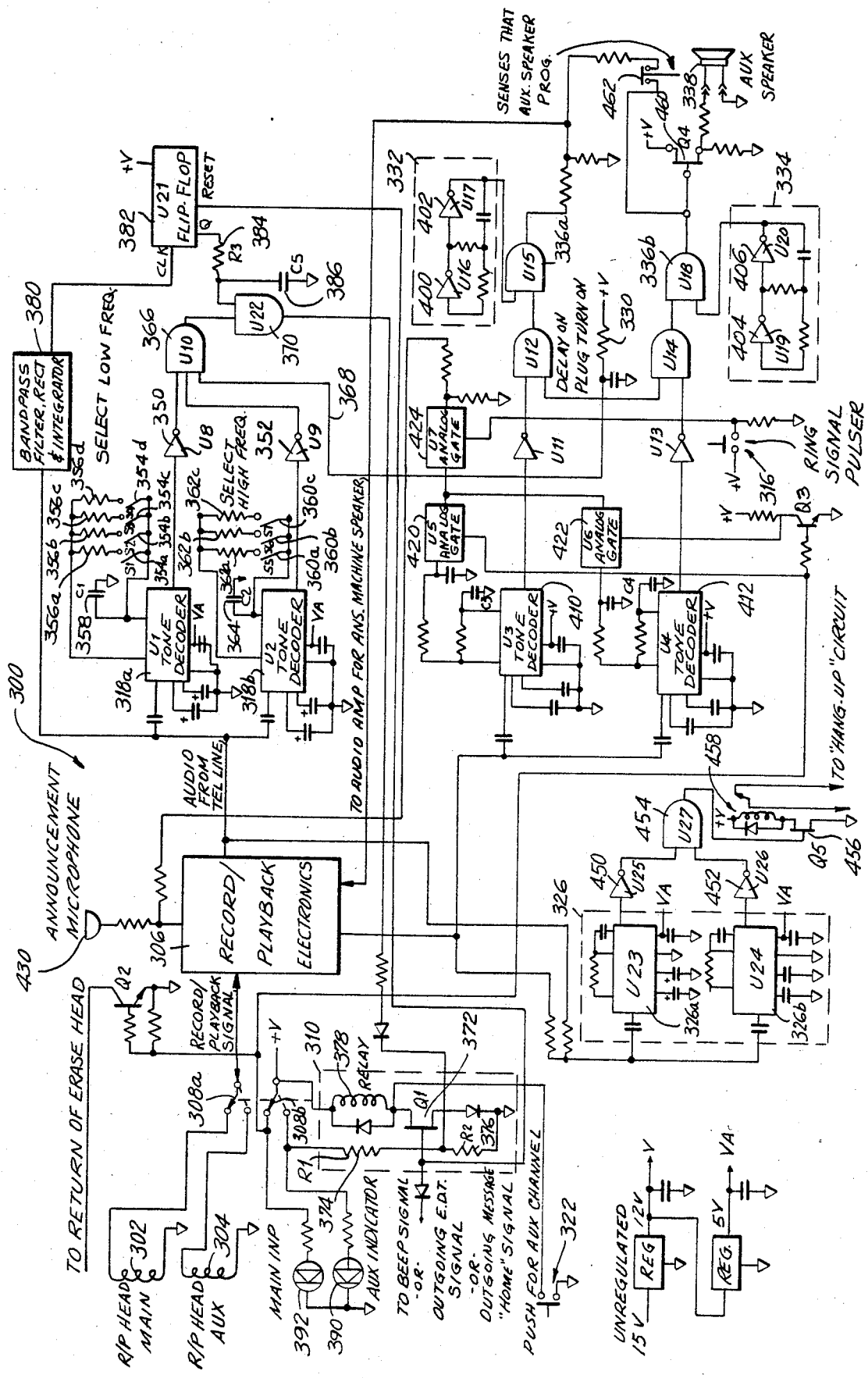
FIG. 14 is a schematic diagram of the apparatus of FIG. 13.

Referring now to the drawings in detail, FIGS. 13 and 14 refer to the presently preferred multichannel interactive telephone answering apparatus, generally referred to by the reference numeral 300, of the present invention which is adapted for use with a two-way telephone line 26–46 after capture thereof so as to enable the caller, providing the appropriate interactive response to prerecorded information messages to select between multiple information channels of the answering apparatus 300, as will be described in greater detail hereinafter. However, for completeness, before describing the presently preferred apparatus 300 of the present invention, the interactive telephone answering system, generally referred to by reference numeral 20, illustrated in FIGS. 1-12 and described in my aforementioned copending U.S. patent application Ser. No. 295,817, now U.S. Pat. No. 4,420,656, shall be described in greater detail.

Figure 1:
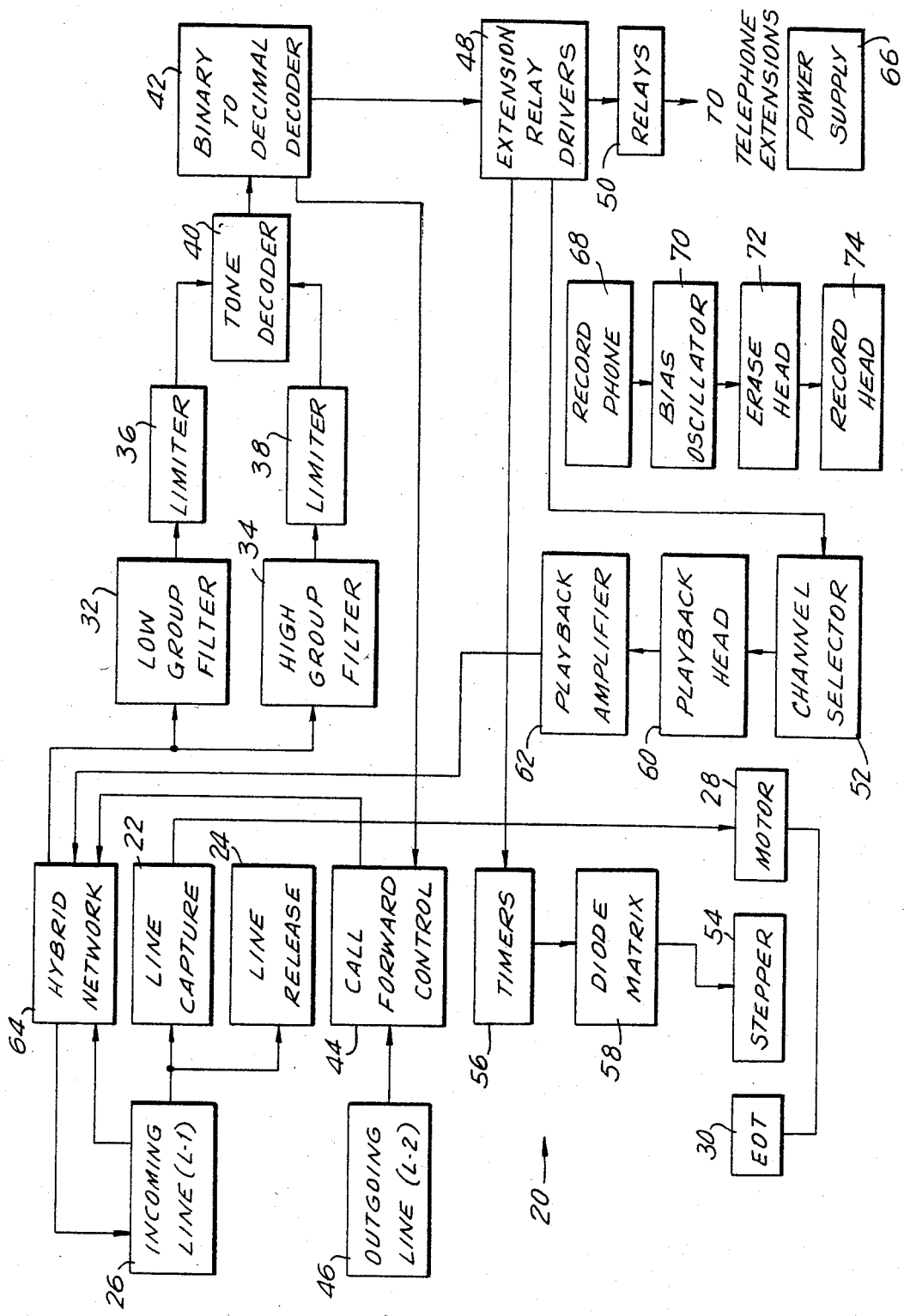
FIG. 1 is a functional block diagram of the presently preferred telephone answering system of my aforementioned copending U.S. patent application Ser. No. 295,817 now U.S. Pat. No. 4,420,656 which may be employed with the multichannel telephone answering apparatus of the present invention.

Referring initially to FIG. 1, interactive telephone answering system 20 is shown. As shown and preferred in FIG. 1, telephone answering system 20 includes a line capture circuit 22 and a line release circuit 24 which are operatively connected to the incoming telephone line 26, as will be explained in greater detail hereinafter with reference to FIGS. 2 and 9. The telephone answering system 20 also preferably includes a motor control circuit 28 which is connected to the line capture circuit 22 as well as to an end of tape sensing circuit 30, to be described in greater detail hereinafter with reference to FIGS. 3 and 9.

As also shown and preferred in FIG. 1, the telephone answering system 20 also preferably includes Touch-Tone detection and decoding circuitry comprising a conventional low group frequency filter 32 and conventional high group frequency filter 34, each having respective conventional limiters 36 and 38 coupled to the outputs thereof, and a tone decoder 40 to be described in greater detail hereinafter with reference to FIG. 4, whose output is connected to a conventional binary to decimal decoder 42 for providing a digital control signal output in accordance with the decoded tone provided from tone decoder 40, to be described in greater detail hereinafter with reference to FIG. 4. The output of the binary-to-decimal decoder 42 may be provided to call forward control circuitry 44, to be described in greater detail hereinafter with reference to FIGS. 8 and 9 for control of the outgoing telephone line 46, or to extension relay driver circuitry 48, to be described in greater detail hereinafter with reference to FIGS. 5 and 9, which controls the activation of a relay network 50 to effect connection of the calling party to a desired receiving telephone, as will be described in greater detail hereinafter. The digital control signal output of the binary-to-decimal decoder 42 also effects channel selection of the appropriate track in the decision tree via the channel selector circuitry 52 and the stepping circuitry 54 via timers 56 and a diode matrix 58. The audio playback circuitry of system 20 which is illustrated in greater detail in FIG. 6, is illustratively represented in FIG. 1 by playback head 60 and playback amplifier 62 connected to a hybrid network 64 whose output is connected to the incoming line 26. As shown and preferred in FIG. 1, the call forward control circuitry 44 and the low group and high group filters 32 and 34 are also connected to the hybrid network 64. In addition, the power supply 66 and the recording circuitry, represented by record phone circuit 68 bias oscillator 70, erase head 72 and record head 74 are illustratively represented in FIG. 1. As will be described in greater detail hereinafter, the track and channel selection function of the system of FIG. 1 will be described in greater detail with reference to FIG. 5 for selection of a typical channel, such as channel 1. With respect to the recording system, this shall be described in greater detail hereinafter with a reference to FIG. 7.

As will be described in greater detail hereinafter, when an incoming call is received via the incoming line 26, this call is automatically answered by the line capture circuit 22 which, in addition to capturing the line, starts the motor 28 on the multitrack tape deck which is preferably, by way of example, an eight-track continuous loop type cartridge having the information stored thereon in information segments which are related in content and spatially in real time to each other such as described in my aforementioned copending U.S. patent application Ser. Nos. 97,687 and 295,817, now U.S. Pat. Nos. 4,320,256 and 4,420,656, respectively, which are incorporated by reference herein in their entirety. A prerecorded message is then presented to the calling party through the playback amplifier 62 and the hybrid network 64, with this message initially confirming that the calling party has reached a desired receiving party station, as will be described in greater detail hereinafter. The message would then instruct the calling party on how to proceed through the prerecorded decision tree so as to reach the desired receiving party or function at that station. The calling party proceeds through the decision tree in a verbally interactive environment by use of the appropriate Touch-Tone buttons on the calling party's telephone on command of the prerecorded messages provided from the tape. When the Touch-Tone button or key is depressed on the calling party's telephone, this unique tone signal is routed to filters 32 and 34 and, via limiters 36 and 38, to the tone decoder 40. The tone decoder 40 output is preferably converted to a decimal format in the binary-to-decimal decoder 42 to provide a digital control signal which selects the next appropriate tape channel and track and also, where appropriate, activates the receiving telephone extension to which the calling party wishes to be connected, as will be described in greater detail hereinafter. Thus, when the calling party has passed through the decision tree process and indicates which telephone extension is desired, that extension is activated and connected to the ringing generator in response to detection of a ringing tone or arming signal associated with the ultimate branch of the decision tree selected by the caller. When the chosen telephone extension comes off hook, the calling party would then be directly connected to the desired receiving party while simultaneously, the line capture circuit 22 would be deenergized to turn control of the captured telephone line over to the selected telephone extension. When this telephone extension phone is placed back on hook, the incoming line 26 would be disconnected and the system 20 would be ready for the next call. Preferably, after the connection is made to the desired telephone extension, the prerecorded message would be concluded and the end-of-tape sensor 30 would generate a signal which would turn off the motor 28.

Figure 2:
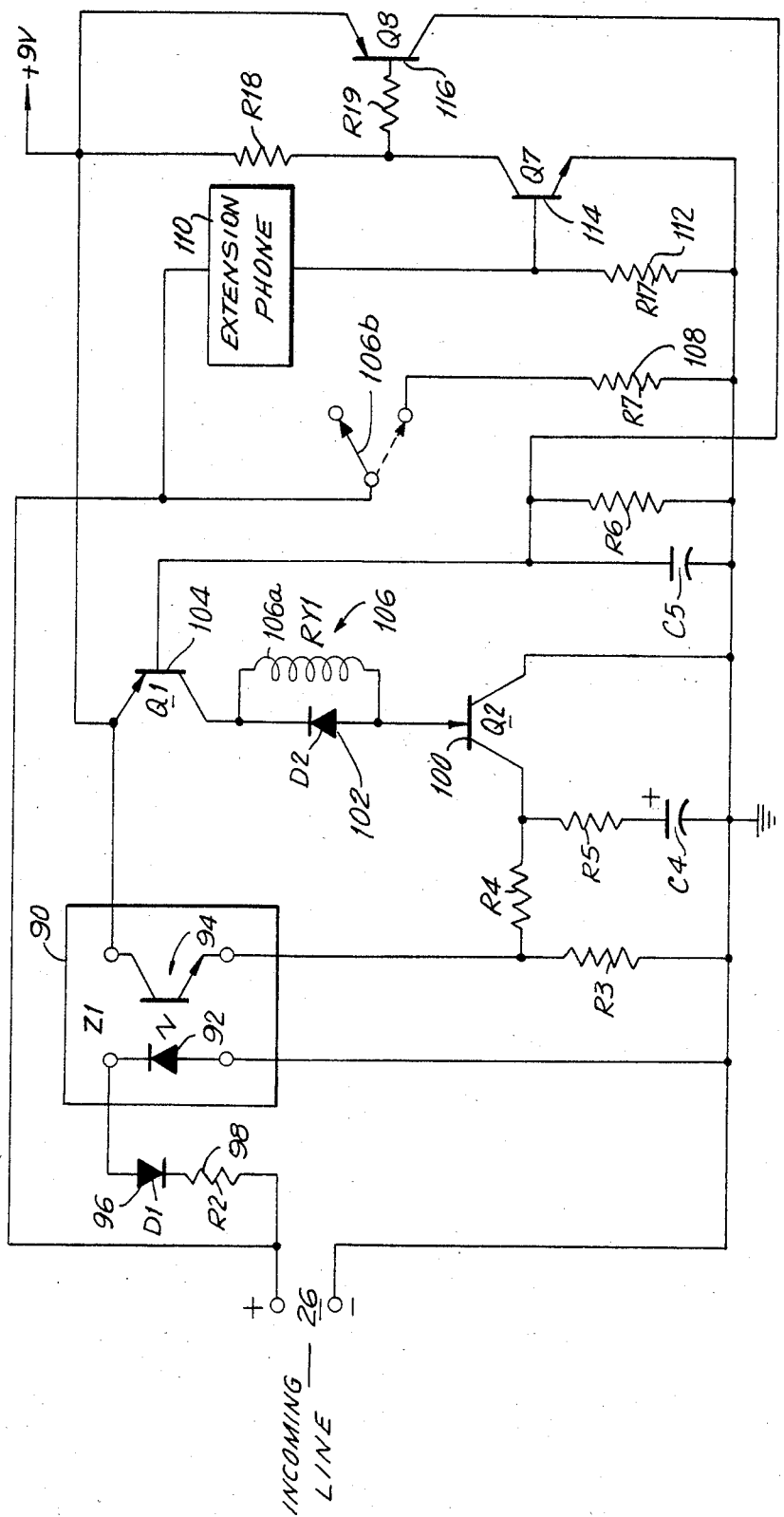
FIG. 2 is a schematic diagram of the line capture and release portions of the system of FIG. 1.

Now referrng to FIG. 2, the line capture 22 and line release 24 circuitry of the system 20 shall now be described in greater detail. As shown and preferred in FIG. 2, line capture is initiated by the ringing signal of an incoming call provided via the incoming line 26. The line capture and line release circuitry 22-24 preferably includes an optical coupler 90 which is fired when the first negative-going cycle of the ringing signal provided via the incoming line 26. The line capture and line release circuitry 22-24 preferably includes an optical coupler 90 which is fired when the first negative-going cycle of the ringing signal provided via the incoming line 26 exceeds a predetermined value, such as 75 volts by way of example. As shown and preferred in FIG. 2, the optical coupler 90 is conventional and includes a conventional LED or light emitting diode 92 optically coupled to a conventional photo-transistor 94. The light emitting diode 92 is coupled to the incoming line 26 by means of a diode 96 and a resistor 98 whose value is chosen such that light emitting diode 92 is fired when the aforementioned first negative-going cycle of the ringing signal exceeds the desired predetermined value, such as the aforementioned 75 volts by way of example. When the light emitting diode 92 is fired, the illumination from light emitting diode 92 places the photo-transistor 94 into the conducting state. This action preferably generates a positive pulse at the gate of an SCR 100 coupled to the collector of the phototransistor 94 via a diode 102 and a transistor 104, with a conventional relay 106 having its coil 106a coupled across diode 102 and its switch contact 106b connected between the incoming line 26 and a resistive impedance 108. Thus, when SCR 100 is turned on, relay 106 is energized and switch 106b is placed in the dotted position illustrated in FIG. 2 thereby placing resistor 108 across the incoming line. This stimulates an off-hook condition and causes capture of the line. If an extension phone 110 is subsequently answered, its circuit will be completed through another resistive impedance 112 to ground and transistors 114 and 116 will be turned on and the base of transistor 104 will be made positive. This will cause transistor 104 to turn off and SCR 100, relay 106 and resistive impedance 108 will be released, with switch 106*b* opening. This will place the extension telephone 110 in control of the captured telephone line. Thus, when the conversation is concluded and the extension telephone 110 is again placed on-hook, the incoming line 26 will automatically be released. The balance of the circuitry illustrated in FIG. 2 is conventional and will not be described in greater detail hereinafter.

Figure 3:
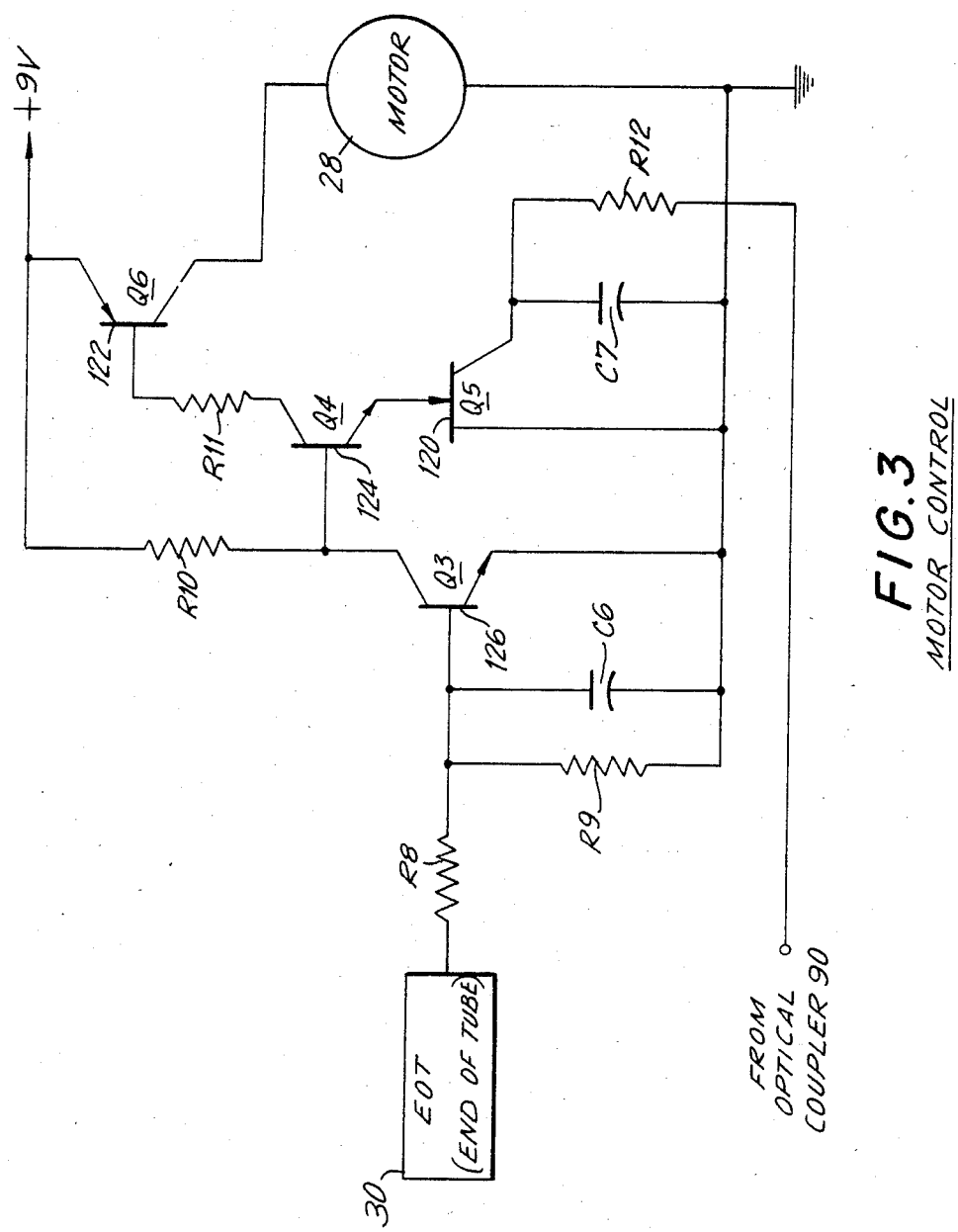
FIG. 3 is a schematic diagram of the motor control portion of the system of FIG. 1.

Referring now to FIG. 3, the motor control circuitry for controlling the operation of the motor 28 which controls the multitrack tape unit shall now be described in greater detail. As was previously mentioned, the ringing signal of an incoming call provided via the incoming line preferably fires the optical coupler 90 in the line capture and release circuitry 22-24. This also generates a positive trigger pulse to the gate of an SCR 120 located in the motor 28 control circuit. When this SCR 120 is turned on, it provides a base drive current to a transistor 122 connected to the motor 28 through transistor 124 and voltage is applied to the tape driving motor 28. As will be described in greater detail hereinafter, preferably the prerecorded multitrack tape includes a conducting tab at the end of the prerecorded tape which when sensed, preferably causes a positive voltage to be applied to the base of another transistor 126 from the end-of-tape sensor 30 thereby turning on transistor 126. Preferably, simultaneously with this, transistors 122 and 124 and SCR 120 are turned off thereby removing the drive voltage from the tape driving motor 28. The balance of the circuitry illustrated in FIG. 3 is conventional and will not be described in greater detail hereinafter.

Figure 4:
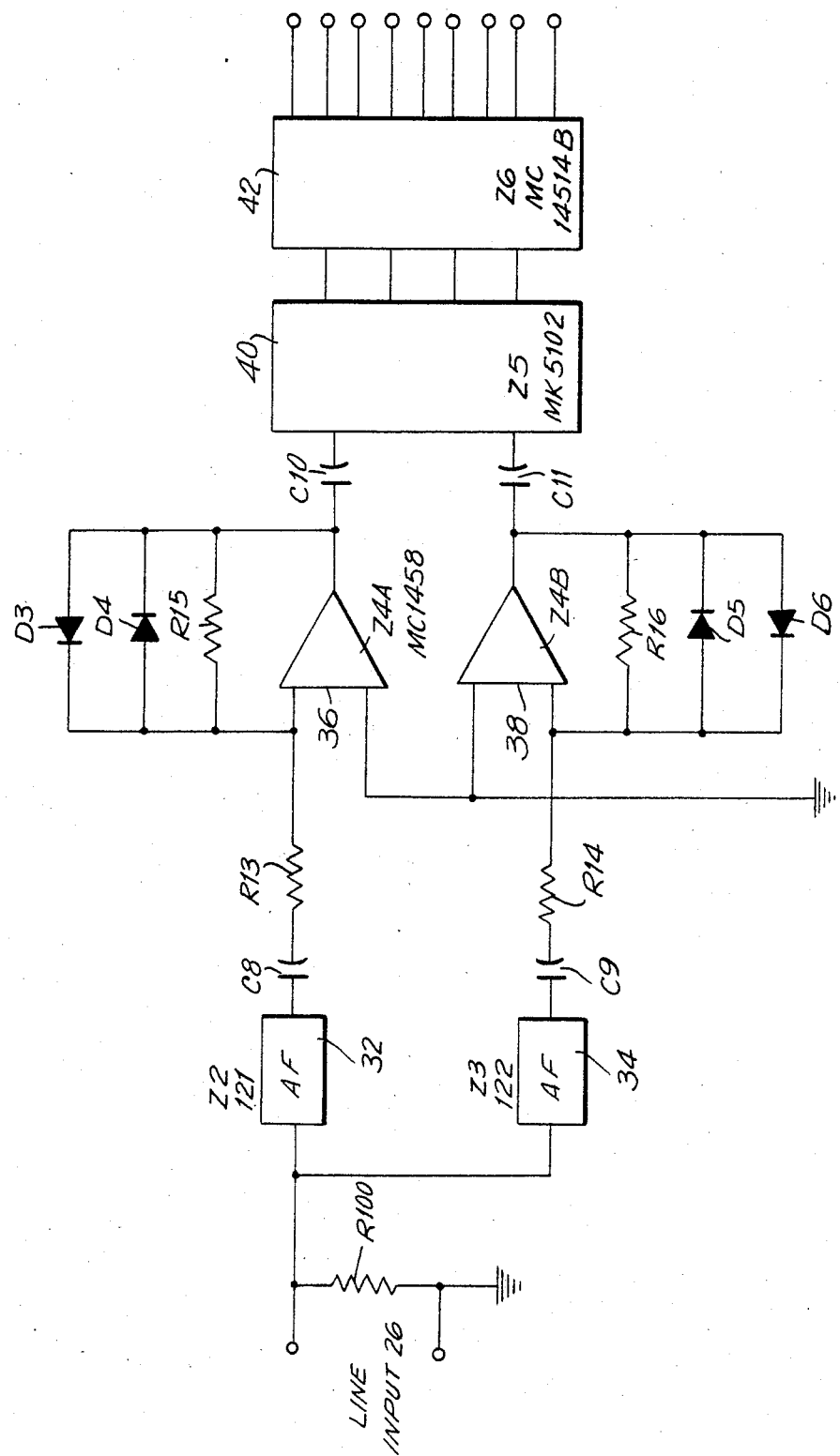
FIG. 4 is a schematic diagram of the tone decoder portion of the system of FIG. 1.

Referring now to FIG. 4, the tone detection circuitry which is employed in the system of FIG. 1 to generate the necessary digital control signals for operation of the various relays and track and channel selection in the system of FIG. 1 shall now be described in greater detail hereinafter. Assuming a conventional Touch-Tone telephone is employed in connection with the system 20 of FIG. 1, each Touch-Tone digit is composed of two discrete frequencies in accordance with the following conventional dialing matrix of Table 1.

TABLE 1

| Hz | 1209 | 1336 | 1477 |
|---|---|---|---|
| 697 | 1 | 2 | 3 |
| 770 | 4 | 5 | 6 |
| 852 | 7 | 8 | 9 |
| 941 | * | 0 | # |

Each digit in the above table generates one tone from the low frequency group which is conventionally termed the range of 697 to 941 Hertz, and one tone from the high frequency group which is generally termed the range of 1209 to 1477 Hertz. This composite signal is generated or transmitted by the calling party in the system 20 in order to effect channel selection as well as telephone extension, as will be described in greater detail hereinafter. The transmitted tone signal provided via the captured telephone line 26 is preferably received by the low group filter 32 and the high group filter 34 which are preferably, by way of example, conventional sixth order elliptic band pass filters which provide a 40 dB separation between the high and low frequency groups. Further conventional conditioning of these received signals is preferably performed in limiters 36 and 38 which are conventional limiters which limit the signal levels, by way of example, to approximately 1.2 volts peak-to-peak. These limited signals are then preferably provided to a conventional Touch-Tone detector and decoder such as an MK 5102 Touch-Tone detector and decoder whose output is the binary equivalent of the number of the digit dialed in four-bit binary code. This binary output of decoder 40 is preferably converted to decimal format in the binary-to-decimal decoder 42, such as a conventional one-of-sixteen binary-to-decimal decoder, such as an MC 145f14 B one-of-sixteen binary-to-decimal decoder. The balance of the circuitry illustrated in FIG. 4 is conventional and will not be described in greater detail hereinafter.

Figure 5:
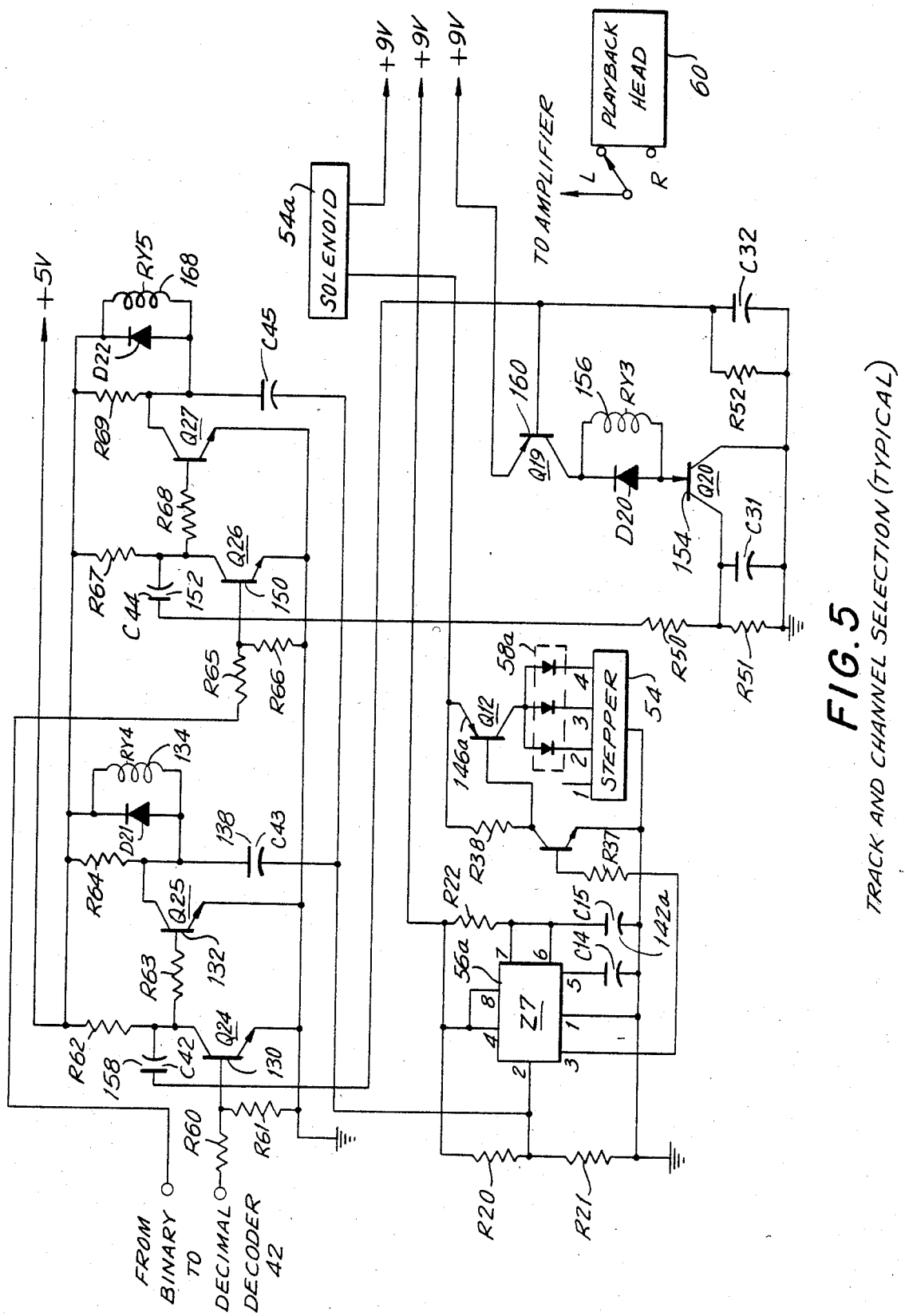
FIG. 5 is a schematic diagram of the typical track and channel selection portion of the system of FIG. 1 illustrating the circuit operation for selection of channel 1 by way of example.
Figure 6:
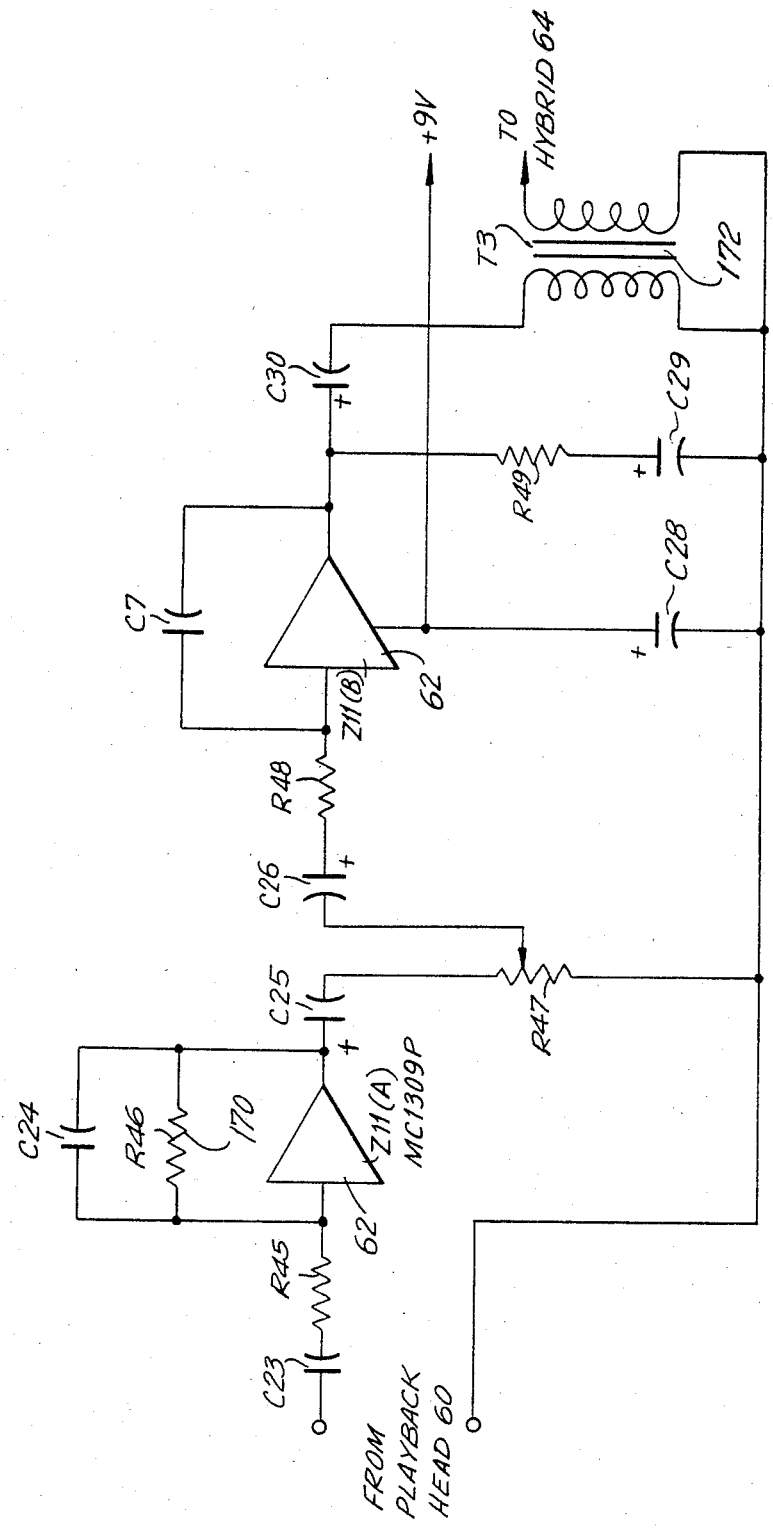
FIG. 6 is a schematic diagram of the playback audio portion of the system of FIG. 1.

Referring now to FIG. 5, the track and channel selection circuitry of the interactive telephone answering system 20 shall now be described in greater detail with reference to a typical circuit operation for selection of channel 1, by way of example. The preferred actual overall circuitry is shown in detail in FIG. 9. With respect to track and channel selection, this is preferably controlled by digits 1 through 8 of the calling party Touch-Tone telephone. By way of example, in an eight track system, digits 1 and 2 could be employed to activate track 1, digits 3 and 4 could be employed to activate track 2, digits 5 and 6 could be employed to activate track 3 and digits 7 and 8 could be employed to activate track 4 with the odd-numbered digits activating the left channel playback head and the even number digits activating the right channel playback head. However, it should be noted that the system need not employ eight-tracks and an eight track system is merely being described herein by way of example. As was previously mentioned, FIG. 5 illustrates a typical example of the circuit operation for selection of channel 1 in connection with the above example. It should be noted that the outputs of the binary-to-decimal decoder 42 are normally high prior to activation. If, in the present example, digit 1 is dialed or depressed on the calling party's Touch-Tone telephone, the output of binary-to-decimal decoder 42 corresponding thereto goes low which would turn transistor 130 coupled to the output of decoder 42 off. Since the collector of transistor 130 is coupled to the base of another transistor 132, transistor 132, will in turn, be turned on and provide a ground for a relay 134 coupled to the collector thereof which prepares extension 1 for connection. The tape deck stepper motor 54 then preferably conventionally selects the track to be employed since the stepper 54 is preferably a conventional ground-seeking system which continues to increment from channel to channel until it stops on a commutator segment which has no ground available. Thus, if channel 1 is desired, it is necessary to provide grounds on channels 2, 3 and 4 of a four channel system so that the head 60 will then stop in the proper position to playback the message on track 1. By way of example, this action occurs as follows. As the collector of transistor 132 goes to ground, a negative going pulse is preferably coupled to the trigger input of a conventional timer circuit 136, such as an MC 1455 timer, through a capacitor 138. The output of timer 136 is preferably normally low. Upon receipt of the negative trigger pulse, the output of timer 136 preferably goes high for a period of time which is determined by the time constant provided by the combination of a resistor 140 and a capacitor 142 connected thereto. This period is preferably set for approximately 30 seconds, by way of example, which is sufficient time for the stepper motor 54 to cycle through a maximum of 3 tracks in the above example. When the timer 56 output goes high, a pair of transistors 144 and 146 which are connected thereto are preferably turned on thereby providing a ground to commutator contacts 2, 3 and 4 of the stepper motor 54 through the diode matrix 58. The stepper solenoid 54a then preferably increments the playback head 60 to the proper position by means of a conventional ratchet-and-pawl mechanism (not shown).

Figure 9A:
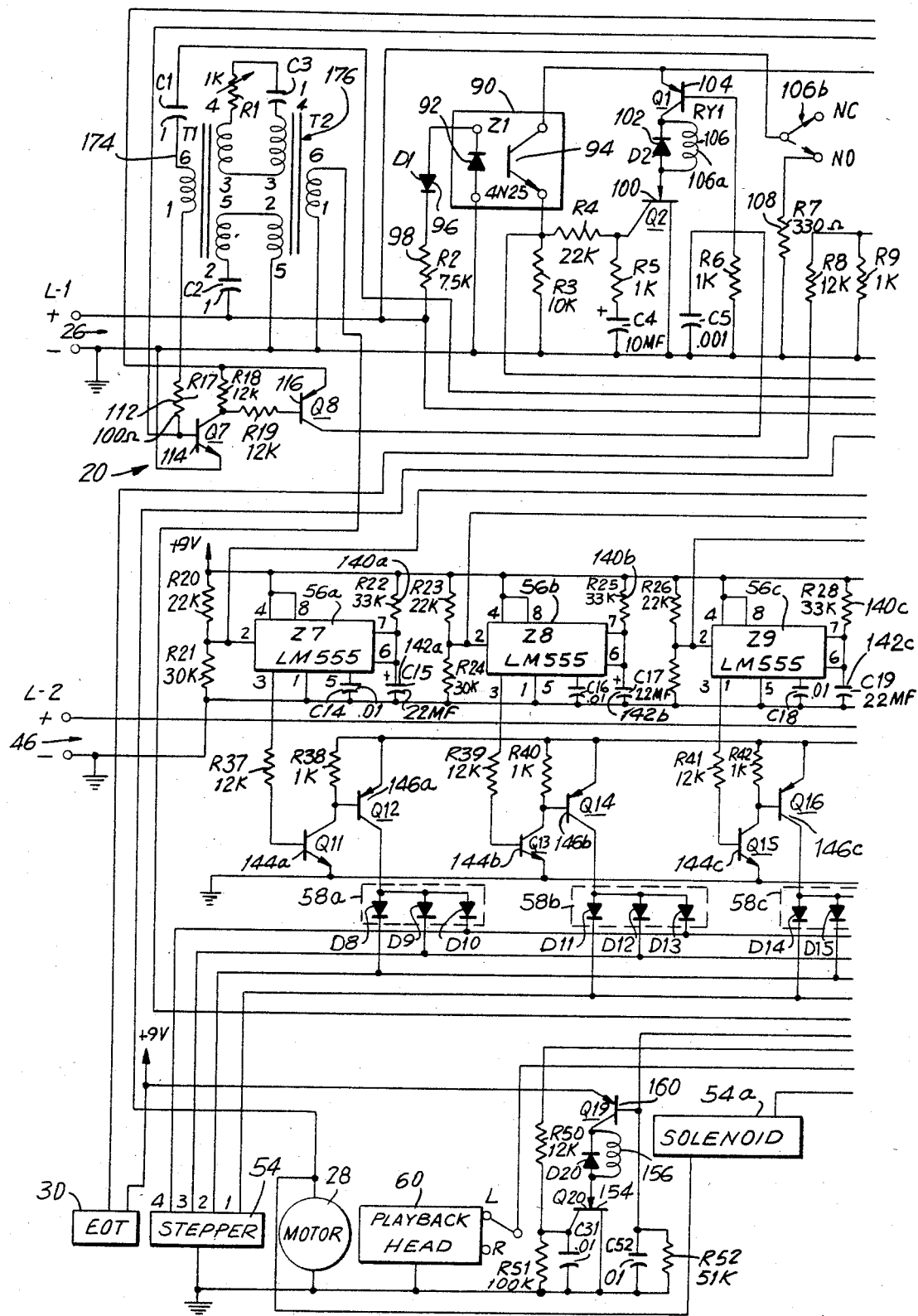
FIG. 9 consisting of A–C are overall schematic diagrams of the system of FIG. 1.
Figure 9B:
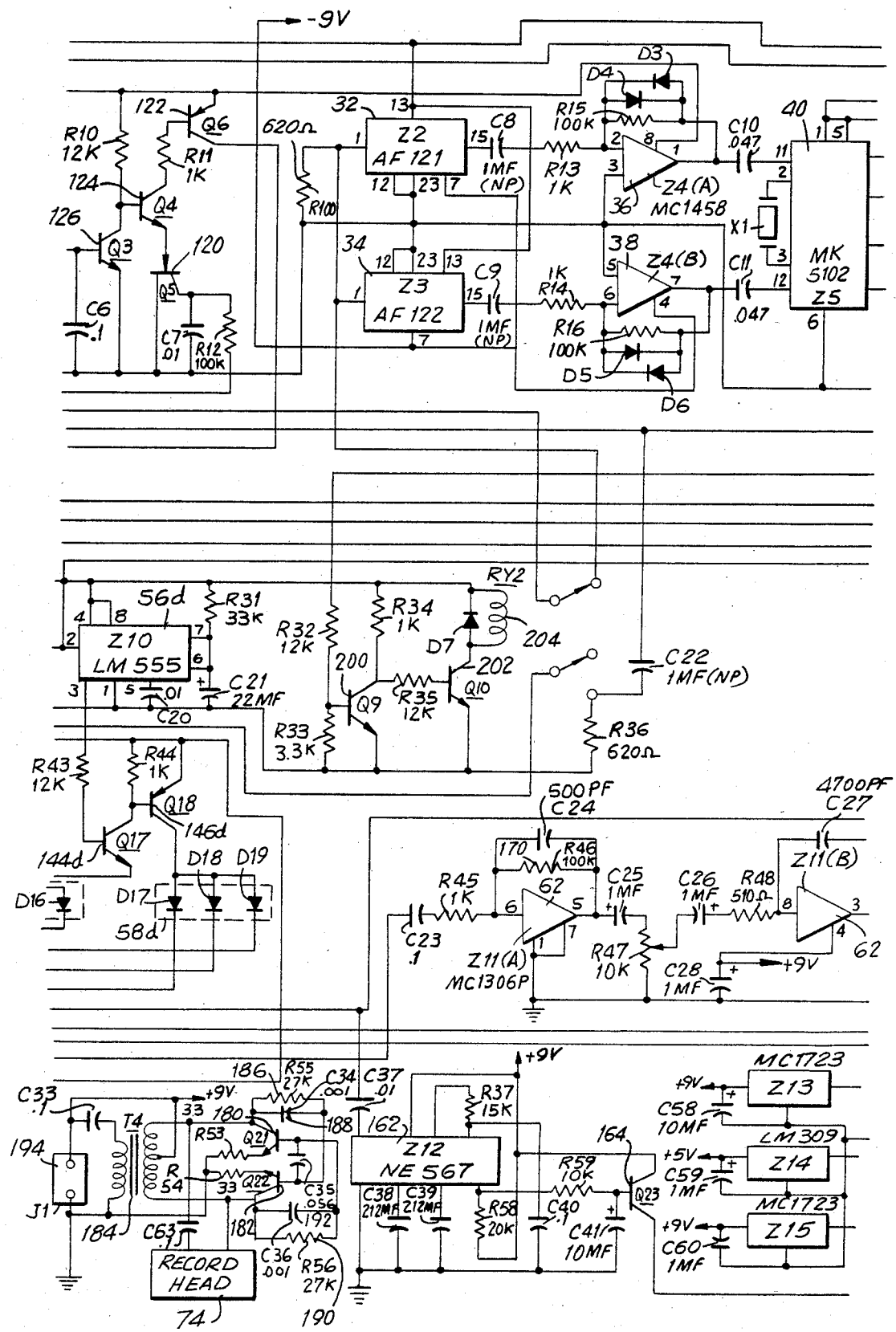
Figure 9C:
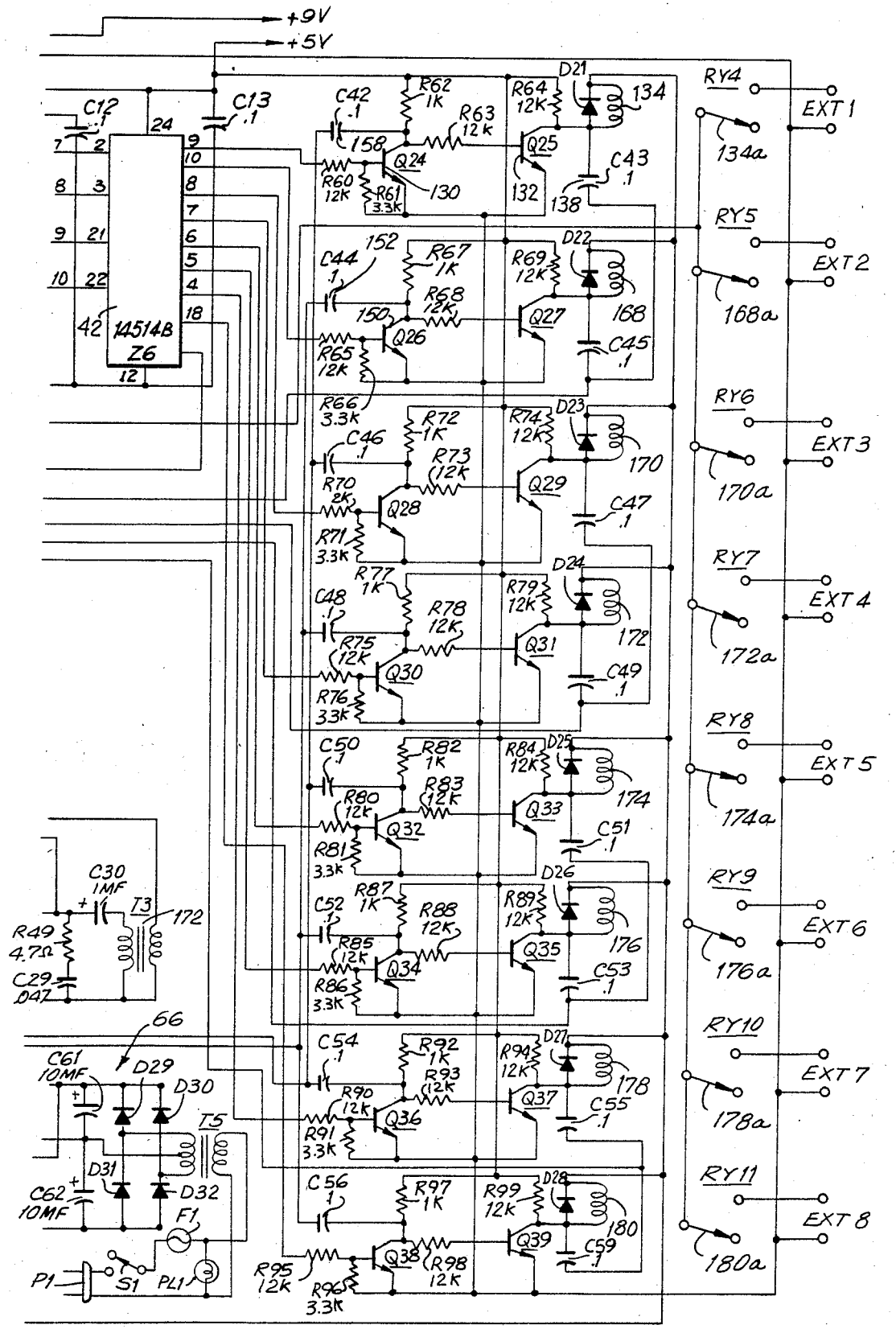

It should be noted that channel selection is pfeferably accomplished in the system 20 as part of the track selection process. Thus, if in the above example, digit 2 is dialed or pushed on the calling party Touch-Tone telephone, then transistor 150 will be turned off. As the collector of transistor 150 goes high, a positive pulse is preferably coupled through a capacitor 152 to the gate of an SCR 154. A relay 156 is coupled to the SCR 154 and, when the SCR 154 is turned on the relay 156 is energized thereby activating the right channel playback head 60. If, instead, digit 1 is dialed or pushed on the calling party Touch-Tone telephone, then transistor 130 is turned off, and a positive going pulse is coupled through a capacitor 158 to the base of a transistor 160 which is then turned off, as is the SCR 154, thereby releasing the relay 156 which reverts the system 20 back to the left channel playback head 60. After the calling party has selected the desired extension or, as will be described in greater detail hereinafter, has reached the ultimate branch in the selected decision tree, the multitrack tape will play a prerecorded arming signal or tone which is preferably recognized by a conventional tone decoder 162 (FIG. 9) such as an NE 567 Tone Decoder. Upon receiving in-band tone, the output of decoder 162 goes low turning on a transisor 164 (FIG. 9) which energizes and connects the caller to the appropriate telephone extension relay, such as relay 166 for extension 1, relay 168 for extension 2, relay 170 for extension 3, relay 172 for extension 4, relay 174 for extension 5, relay 176 for extension 6, relay 178 for extension 7 or relay 180 for extension 8, by way of example, in the above eight-track example, with each of the aforementioned relays having an associated switch 166a, 168a, 170a, 172a, 174a, 176a, 178a and 180a, respectively (FIG. 9). The balance of the circuitry of FIG. 5 is conventional and will not be described in greater detail hereinafter.

Referring now to FIG. 6, a typical playback audio system circuit employable in the system 20 is shown. Preferably, signals from the prerecorded multitrack tape are applied to the playback amplifier 62 which, by way of example, may be a conventional 250 milliwatt power amplifier such as an MC 1309 power amplifier, which includes gain control provided by a potentiometer 170. A conventional transformer 172, which is preferably coupled to the hybrid network 64, preferably provides impedance matching between the playback amplifier 62 output and the incoming line 26. The hybrid network 64 is preferably formed by a pair of transformers 174 and 176 (FIG. 9) which provide two-way communication on a two-wire line and preferably prevent any spurious signals on the tape from entering the input of the tone decoder 40 and causing erroneous channel and track changes. In addition, hybrid network 64 also preferably prevents the loading down of incoming signals by the low output impedance of the playback amplifier 62. The balance of the circuitry of FIG. 6 is conventional and will not be described in greater detail hereinafter.

Referring now to FIG. 7, a typical recording system employable in the interactive telephone answering system 20 is shown. Thus, the system 20 also preferably includes the ability to record messages on the endless loop multitrack tape. If distortion free tape recording is desired, then preferably the conventional high frequency bias oscillator 70 is employed during the recording process. This oscilator 70 also provides the erasure of any previously recorded signals on the tape. The conventional bias oscillator 70 in FIG. 7, is preferably composed of transistors 180 and 182 and transformer 184 and the various associated conventional components. The free running frequency of this oscillator 70 is preferably determined by a resistor 186, a capacitor 188, a resistor 190 and a capacitor 192. A conventional modular telephone jack 194 is preferably provided which accepts a standard telephone which may be used for the prerecording of tapes by the party possessing the telephone answering system 20 of the preseht invention, as will be described in greater detail hereinafter. The telephone and oscillator 70 are preferably powered by an internal power supply 66, with track and channel selection in the prerecording phase being accomplished by dialing of the appropriate Touch-Tone digits, as will be described in greater detail hereinafter. The telephone microphone is preferably employed in such an instance to record the desired message, with the audio signal modulating the bias oscillator 70 by injection into the primary of transformer 184. The balance of the circuitry of FIG. 7 is conventional and will not be described in greater detail hereinafter.

Referring now to FIG. 8, the call forward control circuitry 44 of the system 20 shall now be described in greater detail. If desired, at the appropriate point in the prerecorded message on the multitrack tape, a calling party may have the incoming call forwarded to a different telephone number at which the ultimate receiving party is located. This is preferably accomplished by prerecording the Touch-Tone's signals or dialing code for the call-forward station on the tape. Prior to this point on the tape, the calling party would preferably be instructed to dial a particular code, such as the star digit on the calling party's Touch-Tone keypad. In such an instance, the output from the binary-to-decimal decoder 42 would be a positive going signal which would turn on a pair of transistors 200 and 202 (FIG. 9) thereby activating a relay 204. This relay 204 would then disconnect the incoming line 26 from the Touch-Tone decoder 40 so as to prevent the prerecorded call-forward dialing code or Touch-Tones signals on the tape from activating the decoder 40. Relay 204 also preferably captures the outgoing line 46 and connects it to the incoming line 26. The prerecorded dialing code or Touch-Tone signals are then presented to the outgoing line 46 through the playback amplifier 62 and the call-forwarding number is automatically dialed. At the completion of the call, when both incoming and outgoing phones are placed on-hook, the system 20 is released and ready for the next call. The balance of the circuitry of FIG. 8 is conventional and will not be described in greater detail hereinafter.

With respect to the balance of the circuit in FIG. 9, which is an overall system 20 schematic, the balance of the circuitry other than previously described, is conventional and will not be described in greater detail hereinafter. Suffice it to say that exemplary conventional components, where practical, are illustrated in FIG. 9 and will be readily understood by one of ordinary skill in the art without further explanation.

With respect to the multitrack storage medium employable in the presently preferred system 20, as was previously mentioned, the tape medium is preferably a continuous loop type cartridge such as an endless loop cassette or, by way of example, an eight-track tape. However, as previously mentioned, the system 20 can be employed using two channels, four channels, eight channels, cassette, reel-to-reel, or any other type of multitrack medium and may contain as many tracks as desired. In addition, multiple multitrack storage devices may be connected together to increase the capacity of the system, such as by staggering the starting times of a plurality of multitrack record/playback devices so as to, theoretically, handle an unlimited number of calls at the same time. For example, ten such devices having staggered starting times could enable each and every call to be answered by the next ready playback device with all tracks being combined with a multicaller phone line. In addition, remote retrieval of messages may preferably be obtained by the use of user created codes which are secure and changeable by the user and which would cause playback of the messages left by various calling parties on the tape. In such an instance, the person seeking to obtain the calling party's messages need not have a separate transmitter but could use the Touch-Tone keypad at a remote location to dial in the appropriate code.

With respect to the prerecorded multitrack tapes, as was previously mentioned, the decision tree format of these tapes is preferably substantially identical with that previously described in my copending U.S. patent application Ser. Nos. 97,687 and 295,817, now U.S. Pat. Nos. 4,320,256 and 4,420,656, respectively, of which this application is a continuation-in-part, and the contents of which are specifically incorporated by reference herein in their entirety. Thus, as fully explained in the aforementioned copending patent applications, any of the tracks may contain questions or interrogatory information with any of the other tracks containing responsive messages related in real time and content to a particular interrogatory message on a different track. Moreover, one track may contain a primary interrogatory message which is common to a plurality of different decision trees. Thus, the information is preferably stored on each track in a plurality of reproducible information segments with each of the segments preferably comprising a complete message reproducible directly in response to selective playback of the track upon which the segments are being stored. At least one of the tracks at a given time contains stored information which comprises a primary interrogatory message or messages and associated multiple choice selectible responses, such as derivative secondary interrogatory containing messages related in content to a particular primary interrogatory message so as to provide the caller selectible decision trees. In addition, at least a plurality of the other tracks at any given time preferably comprise messages related in real time and content to the aforementioned primary interrogatory message, such as derivative secondary interrogatory messages, which correspond to the multiple choice selectible derivative secondary interrogatory containing messages so as to provide the various branches of the caller selectible decision trees, with each of the plurality of other tracks, in such an instance, preferably comprising a different derivative secondary interrogatory containing message. Under such circumstances, the plurality of other tracks further comprise associated multiple choice selectible responsive messages related in real time and content to each of the plurality of derivative secondary interrogatory containing messages with, preferably, by way of example, only one of the plurality of other tracks preferably comprising a unique selectible responsive message to the particular one of the real time related derivative secondary messages which are preferably chain linked in content to a particular primary interrogatory message. Thus, preferably the stored primary and derivative secondary interrogatory messages contained on the multitrack storage medium and the associated stored responsive messages are spatially related to each other along the storage medium tracks in real time and further related in content to one another for providing a transitional derivative response or decision tree to the primary interrogatory message provided at a given time dependent on the track selected and the real time of selection, thereby providing an interactive conversational real time transitional environment. These multiple choice selectible different interrogatory messages may each comprise a different category of questions with each of the different categories of questions being associated with a different one of the plurality of other tracks and with the secondary derivative interrogatory messages corresponding to the different categories of questions, whereby a plurality of different interrogatories or decision trees may be simultaneously selectible. In such an instance, the associated responsive messages preferably comprise a common set of responsive messages for each of the different selectible secondary derivative interrogatory messages or decision trees. Each of the decision tree preferably has an ultimate branch and it is this ultimate branch which preferably has a prerecorded arming signal or tone at the completion of the ultimate branch message so as to connect the calling party to the desired extension obtained as a result of the decision tree process. Thus, as previously mentioned, when the calling party has passed through the decision tree process and indicated which extension is desired by selection of the ultimate branch, that extension would be activated and connected to the ringing generator (not shown) as a result of the detection of the arming tone or signal, and the captured telephone line would have control thereof turned over from the multitrack storage device to the selected extension telephone.

The interactive telephone answering system 20 may have many uses, such as in the commercial/industrial area as well as in the home consumer market. As will be described by way of example, in the commercial/industrial area, the telephone answering system 20 can replace small switchboards, eliminate many of the current hold/buzzer type commercial telephone systems and can make larger switchboards more efficient. In addition, through the use of a simple memory module, (not shown) the telephone answering system 20 can calculate on a daily basis the number of branch calls received and the utilization rates of specialized clerks and operators. With respect to the home consumer area, the telephone answering system 20 can be employed to direct calls within a home automatically, screen calls, and forward calls automatically to another number once the calling party has met a series of conditions uniquely established by the receiving party. As will be described in examples below, the telephone answering system 20 is preferably employed with a Touch-Tone type of telephone system. However, the system may be conventionally modified, if desired, to enable employment with other types of telephone systems capable of generating unique signals corresponding to particular telephone digits.

EXAMPLE 1

In the first example, a calling party is verbally instructed to direct their own call through the use of the Touch-Tone button on their telephone. In this way, for example, a business of three to eight employees may replace a switchboard with the telephone answering system 20. For example, the following decision tree may occur:
PRERECORDED MESSAGE: You have reached the law firm of Jones, Block, Smith, and Williams. If you desire Mr. Jones push 1, Mr. Block push 2, Mr. Smith push 3, or Mr. Williams push 4.
(Assume caller then pushes button No. 4 on his Touch-Tone phone)
PRERECORDED MESSAGE: Thank you, please hold on. We are ringing through to Mr. Williams' office for you.

It should be noted that the telephone answering system 20 may, if desired, enable a calling party familiar with the code of the telephone extension desired to interrupt the tape message by immediately dialing in the required code for that extension and then pushing a key or keys corresponding to the arming tone or signal, such as the hatch (#) button on the telephone. This would automatically interrupt the tape message in the above example and route the call immediately to the desired receiving party, such as Mr. Williams.

EXAMPLE 2

Another example of the use of the telephone answering system 20 is in the following decision tree.
PRERECORDED MESSAGE: Thank you for calling American Airlines. If you are calling about today's flights push 1, future flights push 2.
(Assume calling party then pushes 2)
PRERECORDED MESSAGE: Input noted. If you require information on domestic flights push 1, international push 2.
(Assume calling party then pushes 1)
PRERECORDED MESSAGE: Input noted. If you require arrival information push 1, departure information push 2.
(Assume calling party then pushes 2)
PRERECORDED MESSAGE: Thank you. An American Airlines representative specializing in domestic departures for future flights will be with you shortly.

EXAMPLE 3

Another examplary use of the telephone answering system 20 is to screen unwanted calls in the home. In order to do this, the receiving party would give out a prerecorded security code to the callers that the receiving party wishes to be connected with. Under such circumstances, only people who have been given the security code to actually ring through to the residence will be able to accomplish this and all others must leave a message. Of course, the code can be changed easily and frequently as desired. Thus, in this example, a prerecorded message such as the following may be provided:
"You have reached the Smith residence. No one is available to answer right now. At the sound of the tone please leave your name, number and message."

If Mr. Smith has given the calling party his security code, such as 1, 5, the calling party could then push the Touch-Tone buttons 1 and 5 at any time during the above message and security code would immediately cut off the recording and ring through to the Smith's telephone.

Another manner in which this screening of calls could be employed might be in connection with late night calls in which instance the device could be put on a night mode. Again, when the Smith household is called, a prerecorded message would be provided such as
"You have reached the Smith residence. Everyone is asleep right now, but if you deem this call to be sufficiently important push 6 on your Touch-Tone phone."

When 6 were pushed, this would immediately cut off the recording and ring through to the Smith's phone. If desired, of course, this night mode situation could also be handled by a unique security code not provided in the prerecorded message so that only those callers who the receiving party wishes to have the capability of waking the receiving party up would posess this capability.

EXAMPLE 4

Another example of the use of the telephone answering system 20 is in connection with screening calls for call forwarding. An example of this decision tree is as follows:
PRERECORDED MESSAGE: You have reached the office of Dr. Michael Freeman. If this call concerns a medical matter push 1, a non-medical matter push 2.
(Assume calling party then pushes 1.)
PRERECORDED MESSAGE: If you consider this a medical matter of importance push 3. If it can wait until tomorrow push 4.
(Assume calling party then pushes 3.) PRERECORDED MESSAGE: Please hold on. Your call is being automatically forwarded to Dr. Freeman at another number.

Of course, in connection with the above example, if desired, a security code could be required to initiate the call forward sequence.

EXAMPLE 5

Another exemplary use of the system is to selectively screen calls within the home, such as in the following decision tree example:
PRERECORDED MESSAGE: You have reached the Barney residence. If this call is for our son Chuck, please push 1, all other calls please push 2.
If calling party then pushes 1, Chuck's phone rings. If calling party then pushes 2, the downstairs house phone rings.

There are many, many more possible uses of the interactive telephone answering system 20 which would readily occur to one of ordinary skill in the art, such as discriminating one message from another and giving the proper mesage to the proper calling party, such as for salesmen seeking to obtain specialized information from their office in an efficient and rapid manner, or for two people who communicated regularly such as an account representative and a repairman to leave messages for each other on particular reserved channels, or for a question and answer telephone recording machine in which the responses could be electronically scored in a simple memory, or many of the aforementioned capabilities could be combined such as screening, the requirement of a security code and then call forwarding. Thus, a dynamic multipurpose telephone answering system may be provided in accordance with the present invention.

Figure 10:
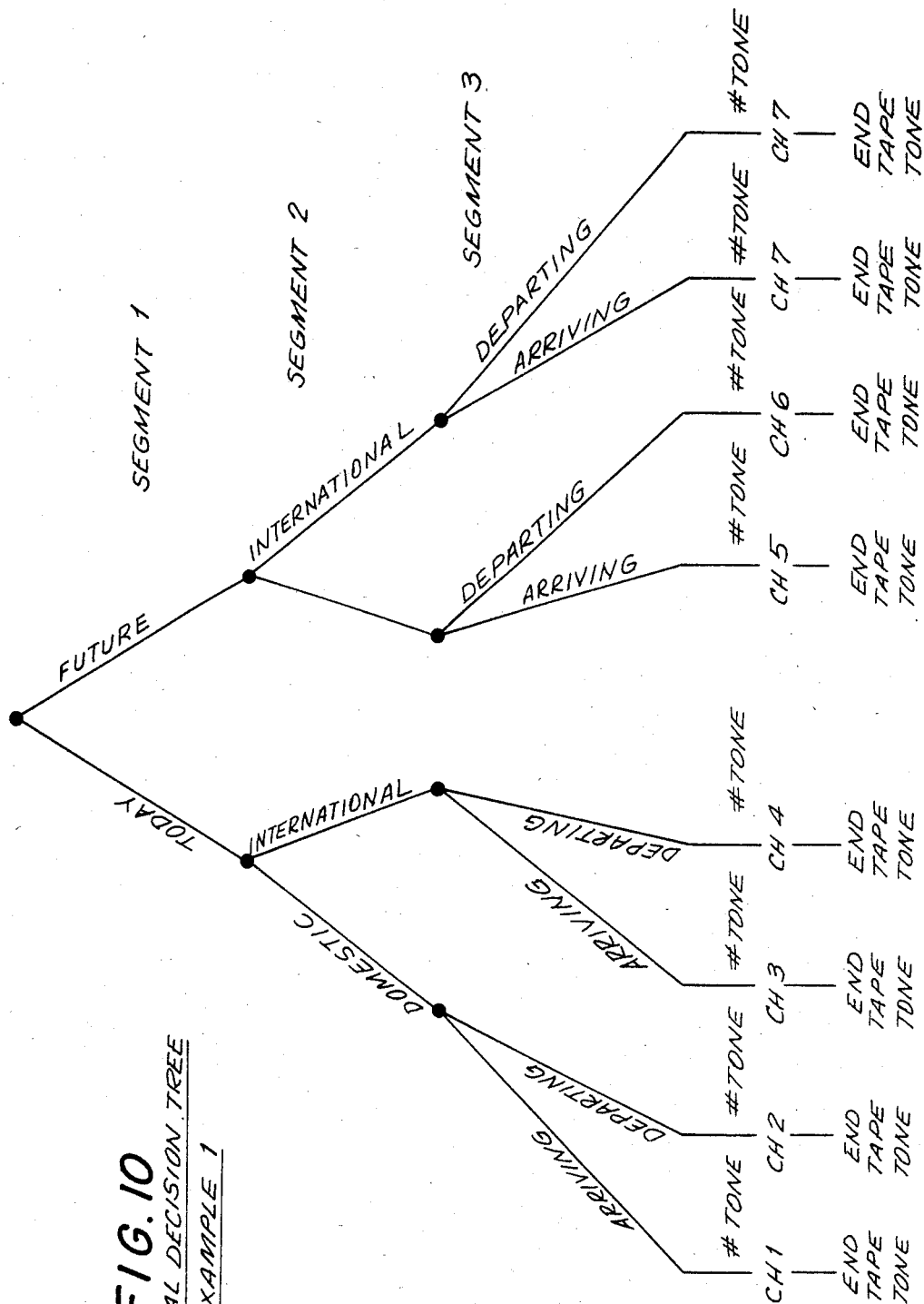
FIGS. 10 through 12 are diagrammatic illustrations of exemplary decision tree formats for use in connection with the system of FIG. 1.
Figure 11:
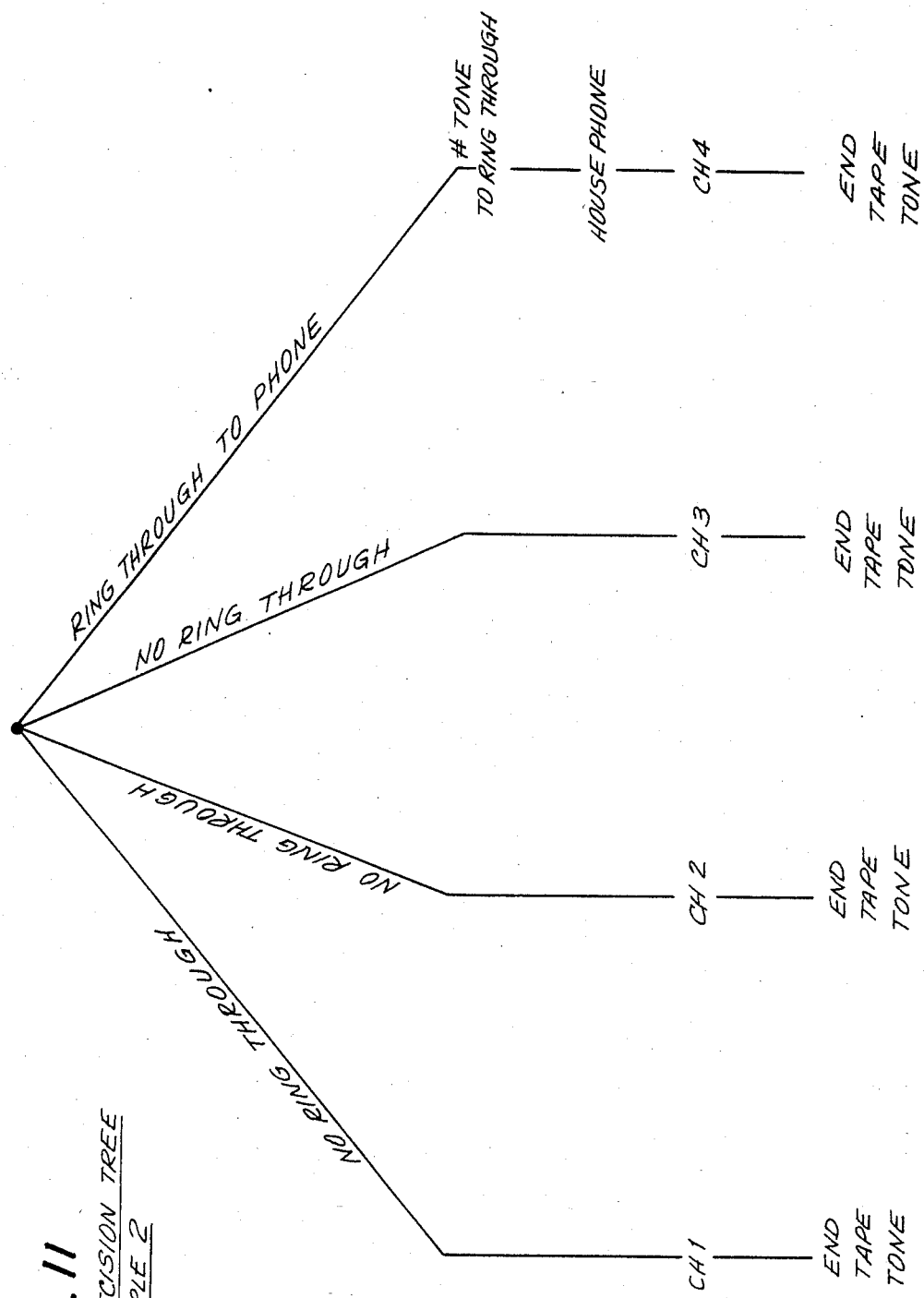

Of course, the tapes usable in the interactive telephone answering system 20 may be prerecorded by the user so that the tapes may be specifically tailored to the user's needs and may contain special user assigned security codes as well as, of course, call forwarding numbers which may vary on a daily basis, for example. FIGS. 10, 11 and 12 illustrate three examples of typical conceptual decision trees which may be created by the user. Before describing these specific examples, the recording process which enabled the user to record each channel in a specially created time sequenced manner on a continuous loop type cartridge shall generally be described. Thus, to begin programming the multitrack tape for use in the interactive telephone answering system 20 the user would pick up the Touch-Tone telephone which has preferably been connected to the input jack 194 of the recording system (FIG. 7) and would use the Touch-Tone telephone keypad to select each channel to be recorded. Pushing button number 1, for example, would bring the tape head 74 to channel number 1 which would then be ready for recording. If desired, of course, separate channel selector buttons could be incorporated into the telephone answering system 20 in place of the use of the user's Touch-Tone telephone key pad. Once the proper channel were selected, the record button would conventionally be pushed activating the record circuit and starting the multitrack tape in motion from its beginning position. It should be noted that, preferably the tape should always cycle to its beginning position and automatically stop. With respect to endless loop cassettes, end tape tones are used to accomplish this and with respect to eight-track tapes, metal strips are used to accomplish this. The user would then record the first channel and the various segments that go on this channel taking care to note the time required to record each separate segment. The user would then allow the tape to recycle to its beginning position and would then push button 2 to select channel 2. Channel 2 would then be recorded in the same manner with its various segments with extreme care being taken to allot the same exact time as alloted on channel 1 to each parallel or coextensive segment. For example, if segment 1 on channel 1 takes 10 seconds to record then segment 1 on channel 2 and all subsequent channels should also be 10 seconds in length so as to be coextensive. If segment 2 on channel 1 takes 15 seconds to record then segment 2 on channel 2 and all subsequent channels should also take up 15 seconds of recording time. The only exceptions are the last segment of a channel or if no further related branch is required; since no further branch decisions would take place after these two events the timing would not be crucial. Once all of the recorded verbal message segments are completed an arming tone or signal, such as the hatch (#) tone is recorded on all channels by depressing the corresponding code, such as the hatch button, on the Touch-Tone telephone. This tone, or some other unique assigned arming tone, would activate an external ringing generator to ring through to the phone, phones, or phone system associated with the ultimate branch or final channel selected by the user at the end of the caller selected decision tree. For example, if the user completes the branching program or decision tree on channel 6, then this tone according to the example of FIG. 10 would ring through to the group of phones corresponding to clerks specializing in future, domestic, departing flights for Universal Airlines. Since the hatch (#) tone in the above example is used to activate the ring generation system, a calling party who knew the branching program by heart could interrupt the taped message and push button 6 and then the hatch button to immediately ring through to the desired phone or group. This would eliminate the need to listen to the entire taped message if the caller knew the proper buttons to select. Once the connection were made between the calling party and the ultimate phone or group, a final end-of-tape tone, or a metal strip, would preferably appear to automatically stop the endless loop tape so it would be in a position to either record the next channel or answer the next call. In other words, the end-of-tape tone, or the metal strip, would preferably appear directly after the ring generation tone or arming tone since at this point the tape would no longer be required. It should be noted that once the connection is made to the receiving party, and the multitrack tape goes off line, the tape preferably recycles to the beginning of the tape and waits for the next incoming call.

Table 2 below corresponds to the example of FIG. 10 for prerecording a branching program using eight channels.

Table 3 below corresponds to FIG. 11 and illustrates a branching program employing four channels.

TABLE 3

| ELAPSED TIME IN SECONDS | | CHANNEL 1 | CHANNEL 2 | CHANNEL 3 | CHANNEL 4 |
| --- | --- | --- | --- | --- | --- |
| 1 | SEGMENT 1 | You have reached | SAME AS CH 1 | SAME AS CH 1 | SAME AS CH 1 |
| 2 | | the residence of | | | |
| 3 | | Michael Freeman. | | | |
| 4 | | Everyone is as- | | | |
| 5 | | leep right now | | | |
| 6 | | but if you feel | | | |
| 7 | | this call is suf- | | | |
| 8 | | iciently impor- | | | |
| 9 | | tant, then push | | | |
| 10 | | number 4 on your | | | |
| 11 | | touch tone phone | | | |
| 12 | | | | | |
| 13 | SEGMENT 2 | Thank you for not | SAME AS CH 1 | SAME AS CH 1 | Hold on, we will |
| 14 | | distrubing us. | | | ring through to |

TABLE 3-continued

| ELAPSED TIME IN SECONDS | CHANNEL 1 | CHANNEL 2 | CHANNEL 3 | CHANNEL 4 |
| --- | --- | --- | --- | --- |
| 15 | Please call back |  |  | the phone for |
| 16 | Tomorrow. |  |  | you. |
| 17 |  |  |  |  |
| 18 |  |  |  | "#" TONE |
| 19 | END TAPE TONE | END TAPE TONE | END TAPE TONE | END TAPE TONE |

Table 4 corresponds to FIG. 12 and illustrates another branching program using four channels and employs call forwarding. With respect to call forwarding pushing 9 or any other designated tone would be employed to bring the dial tone into the circuit prior to playback of the prerecorded dialing code corresponding to the call forward number.

TABLE 4

| ELAPSED TIME IN SECONDS |  | CHANNEL 1 | CHANNEL 2 | CHANNEL 3 | CHANNEL 4 |
| --- | --- | --- | --- | --- | --- |
| 1 | SEGMENT 1 | You have reached | SAME AS CH 1 | SAME AS CH 1 | SAME AS CH 1 |
| 2 |  | the office of Dr. |  |  |  |
| 3 |  | Marcus Welby. If |  |  |  |
| 4 |  | this call is a |  |  |  |
| 5 |  | medical matter |  |  |  |
| 6 |  | push 1, if not |  |  |  |
| 7 |  | push 2 |  |  |  |
| 8 | SEGMENT 2 | Thank you. If this | Non medical mat- | You have made an | SAME AS CH 3 |
| 9 |  | medical matter is | ters are being | error. Please |  |
| 10 |  | an emergency, push | handled by taped | hang up and dial |  |
| 11 |  | number 1 on your | message. At the | again. |  |
| 12 |  | touch tone phone. | sound of the tone |  |  |
| 13 |  | If not, please | leave you name |  |  |
| 14 |  | push number 3 | and message.** |  |  |
| 15 |  |  |  |  |  |
| 16 | SEGMENT 3 | Hold on, your call | TONE TO ACTIVATE | Hold on we are | You have made |
| 17 |  | will be automati- | SEPARATE TELE- | ringing through | an error. |
| 18 |  | cally call-for- | ANSWERING MACHINE | to the service | Please hang up |
| 19 |  | warded to Dr. Wel- |  | for you. | and dial again |
| 20 |  | by if you push # |  |  |  |
|  |  | 9 on your touch |  | "#" TONE |  |
|  |  | tone phone* |  |  |  |
|  |  | CALL-FORWARD TONES | END OF TAPE TONE | END OF TAPE TONE | END OF TAPE TONE |
|  |  | & END TAPE TONE |  |  |  |

Referring now to FIGS. 13 and 14, the presently preferred multichannel interactive telephone answering apparatus 300 of the present invention shall now be described. Telephone answering apparatus 300, as will be readily apparent, is particularly adapted for use in the home consumer area, such as referred to above. Apparatus 300, by way of example, provides call screening, night call screening, direct calls within a home to various extensions, and provides multiple or alternate outgoing message capability in response to provision of designated codes by the caller. The telephone answering apparatus 300 of FIGS. 13 and 14 may preferably be employed in an interactive telephone answering system, such as described above. As shown and preferred in FIG. 13, the telephone answering apparatus 300 of the present invention, as was true with respect to the previous description of interactive telephone answering system 20, is a multichannel or multitrack system. As will be described in greater detail hereinafter, the apparatus 300 preferably includes a main channel which is the channel normally utilized if no switching occurs, and at least one auxiliary channel which, as will be described in greater detail hereinafter, is ultilized in conjunction with the main channel to provide the various functional capabilities of the presently preferred telephone answering apparatus 300 of the present invention, such as the aforementioned call screening, call directing and multiple or alternate message capabilities. Thus, as shown and preferred in the functional block diagram of FIG. 13, and as will be described in greater detail hereinafter with reference to the schematic of FIG. 14, the main channel preferably includes a conventional record/playback head 302 for recording and playing back information from the main channel or track of a magnetic storage medium, such as a multitrack tape or cassette, and the auxiliary channel preferably includes a similar record/playback head 304 for recording and playing back information from the auxiliary channel of the magnetic storage medium. Of course, if desired, as previously described with respect to telephone answering system 20, a single multitrack record/playback head could be employed. In either event, conventional record/playback electronics 306 are employed with the record/playback heads 302 and 304 which are selected by means of a switch 308 controlled by channel switching logic 310 to be described in greater detail hereinafter. An internal speaker audio chain 312 including an internal microphone 314 is used to record main channel messages. In addition, an internal generator, to be described in greater detail hereinafter, is preferably used to place speaker trigger tones on the main channel. Speaker trigger tones are those tones which are placed on the outgoing message tape and which are used to effectively "turn-on" the speaker signalling tones which are the tones that are heard from the internal or external or auxiliary speaker. Such a trigger tone generator, such as for recording trigger tones on the auxiliary channel, may preferably be provided by a ring signal pulser 316 which is depressed to gate the trigger tones on to the magnetic storage medium auxiliary channel if the switch 308 is in the dotted line position shown in FIG. 13 and on to the main channel if the switch 308 is in the solid line position shown in FIG. 13. The tones which are gated by the ring signal pulser 316 preferably come from tone generation and decoder circuitry 318 for the speaker trigger tones which tones are again selected via a switch 320 which is preferably controlled by the channel switching logic 310. The auxiliary channel may be selected by pushing an activate alternate channel switch 322 which is normally open. A coded number decoder 324 is also provided which detects the presence of a special number or code so as to send a logic level signal to the channel switching logic 310 via gate 326 when the appropriate code is detected. As further shown and preferred in FIG. 13, the telephone answering apparatus 300 also preferably includes a hash tone decoder 326 for detecting the presence of the hash tone. The circuitry also includes latching circuitry 328 for providing a latching signal after the first tone group, which latching signal is provided to the channel switching logic 310 via gate 326 and delay circuitry 330. The telephone answering apparatus 300 also preferably includes signalling sound generators and associated gain circuitry 332 and 334 for the main and auxiliary channels, respectively. As will be described in greater detail hereinafter, if the telephone answering apparatus 300 is on the main channel, the main channel decoder would be activated which would in turn activate the main channel signalling frequency via circuit 332 and summing network 336 to be heard from the internal speaker 314. If however, the telephone answering apparatus 300 is on the auxiliary channel, the auxiliary signalling frequency via circuit 334 would be heard from the main speaker 338. In addition, as further shown and preferred in FIG. 13, the recording circuitry also preferably includes a conventional erase head 340 having an associated switch 342 which is controlled by the channel switching logic 310 so as to erase information stored on the magnetic storage medium.

Figure 15:
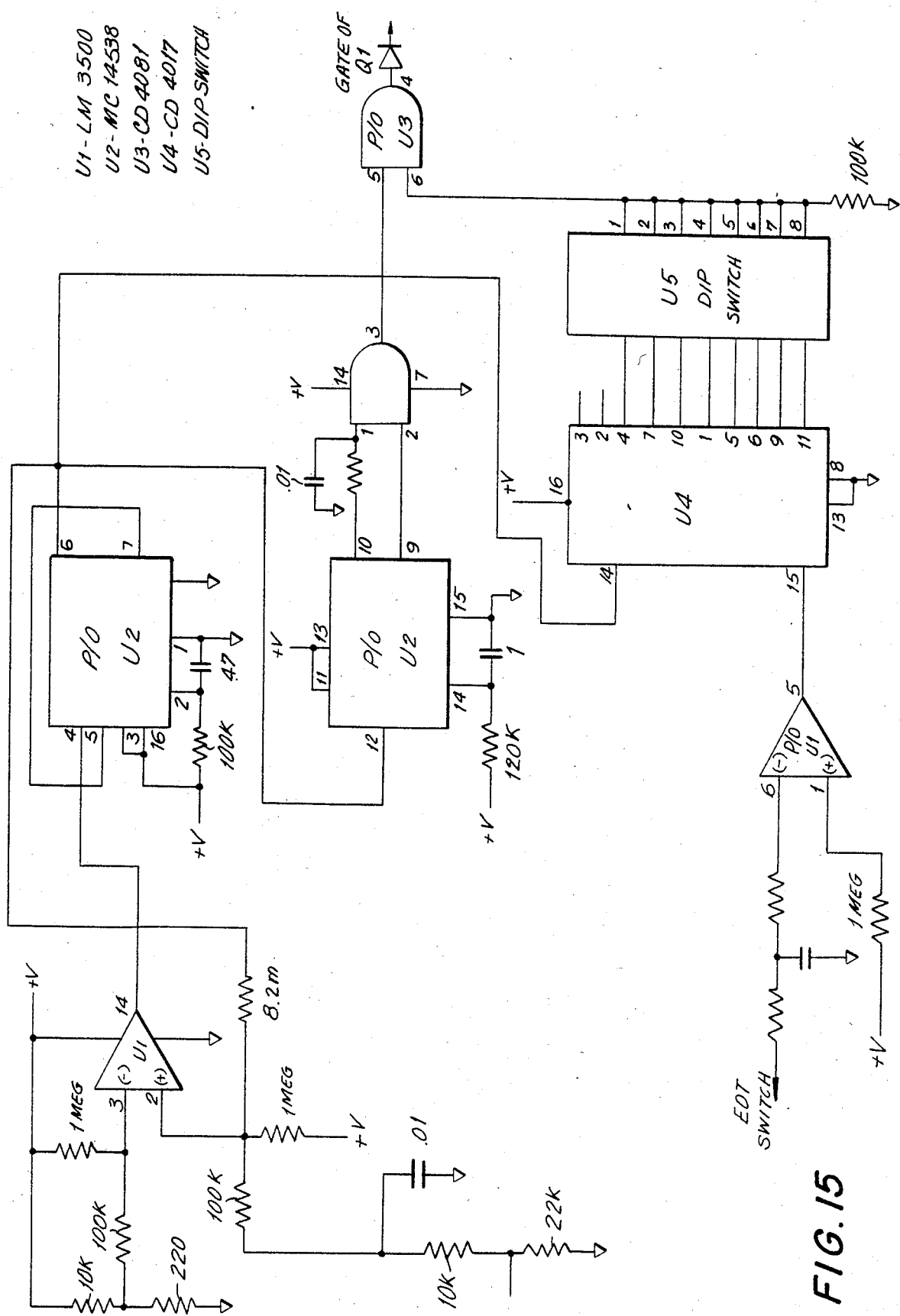
FIG. 15 is a logic block diagram, partially in schematic, circuit for converting dial pulses into Touch-Tone type signals for use in the system of the present invention.

Referring now to FIG. 14, it should be noted that the telephone answering apparatus 300 of the present invention will preferably operate on the main outgoing channel unless the circuitry senses the presence of preselected designated arming signals generated by the caller such as by the use of preselected tone frequencies which are generated by the caller depressing the proper number on a Touch-Tone telephone pad. Of course, the designated arming signals can be provided by the use of dial pulses with appropriate decoding circuitry such as shown in FIG. 15, by other frequency generated signals with appropriate frequency detection circuitry or by voice recognition circuitry responsive to designated voice signals. For purposes of explanation, however, it shall be assumed that the designated arming signals are provided by preselected tone frequencies generated by the caller depressing the proper number on a Touch-Tone telephone pad. In this regard, the selection of the auxiliary channel by the use of the Touch-Tone telephone pad shall be described with reference to FIG. 14. Thus, Touch-Tone signals transmitted over the captured telephone line 26 are sensed from the telephone line by tone decoder 318a and 318b. If the depressed Touch-Tone signal consists of the same frequencies which have been set by the user of the telephone answering apparatus 300 for the tone decoders 318a and 318b, the input of inverters 350 and 352, respectively, are preferably forced low. The center frequency of tone decoder 318a is preferably controlled by the setting of a bank of switches 354a through 354d and associated resistors 356a through 356d and capacitor 358. Similiarly, the setting of the designated arming signal frequency for tone decoder 318b is set by the user through the use of switch bank 360a, 360b and 360c, resistors 362a, 362b and 362c, and capacitor 364. If the tone signals provided by the caller and decoded by decoder 318a and 318b which have been set via switches 360a, 360b, 360c and 354a, 354b, 354c and 354d and the associated resistors and capacitors, match, or are present, then inverters 350 and 352 convert these logic low signals into logic highs and present these logic high signals to the input of AND gate 366. AND gate 366 also receives another input via line 368 from the power circuitry so as to prevent false signals from the tone decoders 318a and 318b providing a high output from gate 366 during power turn on, with the signal via line 368 providing a delay on power turn on. When a logic high output signal is present at the output of gate 366, which occurs after power turn on and during the presence of logic high inputs from inverters 350 and 352, this provides a logic signal via gate 370 which turns on field effect transistor 372 which latches on via resistor 374, resistor 376 and the normally open contacts of relay 378. When the relay 378 operates, the auxiliary tape head 304 is preferably selected and the message on the auxiliary channel is preferably fed to the outgoing message electronics 306. The tone or designated arming signal, generated by the caller is preferably sensed by conventional band pass filter 380, in conjunction with a rectifier and integrator which preferably clocks a conventional flip-flop 382 when the first tone is received over the captured telephone line 26. Flip-flop 382 in conjunction with AND gate 370 and an associated RC network 384-386 will preferably allow only one attempt for the caller to push the correct Touch-Tone number with a gating signal being provided from gate 370 only during the interval when the clocking signal is provided from the flip-flop 382 which clocking signal provides a "window" during which the logic output signal of gate 366 can be clocked to turn on transistor 372. Preferably, an auxiliary channel lamp indicator 390 and a main channel auxiliary lamp indicator 392 are provided which indicators are illuminated at the appropriate time. For example, the auxiliary channel indicator 390 is preferably illuminated if the correct tone is received by the telephone answering apparatus 300. If the correct tone is not received, or the caller does not depress any buttons, the outgoing message is then preferably provided from the main channel. As was previously referred to with reference to FIG. 13, when the user desires to record messages on the auxiliary channel, the activate auxiliary channel switch or button 322 is depressed. The depressing of this button 322 preferably causes transistor 372 in the channel switching logic 310 to latch in the on state via relay 378 contacts and resistors 374 and 376 thereby connecting the record playback electronics 306 to the auxiliary tape head 304 by means of moving switch 308a–308b to the dotted line position in FIG. 14.

Now describing the function relating to the actuation of the internal speaker 312, this speaker is activated by signalling generators 400 and 402, or 404 and 406 by the recorded trigger tone on the outgoing message tape or magnetic storage media. The caller is the one who dictates which signal tone is to be activated by either not depressing a Touch-Tone number in the above example or by depressing the correct number. If the correct Touch-Tone number is pressed, the prerecorded trigger tone on the outgoing message tape would be sensed by conventional tone decoders 410 and 412. If the telephone answering apparatus 300 is on the main channel at that time and the tone recorded on the main channel consists of the same frequencies that are set for tone decoder 410, then the signalling frequency generated by signalling generators 400 and 402 is preferably passed to the internal speaker 312 via gate 336a. If, on the other hand, the caller depresses the correct number on the Touch-Tone pad, and the telephone answering apparatus 300 switches to the auxiliary channel, the prerecorded trigger tone on the auxiliary channel would be sensed or detected by tone decoder 412. If this tone consists of the same frequencies that are set for tone decoder 412, then the signalling frequency that developed by signalling generators 404 and 406 are passed via gate 336b to the internal speaker 312.

The aforementioned speaker signalling tones which are the tones to trigger the speaker are preferably placed on the main and auxiliary channels during the announcement record mode using the same tone decoders 410 and 412 that are used to sense their presence. In this manner, potential problems of calibration are minimized. In order to generate the speaker signalling tones, the ring signal pulser switch 316 is depressed. In the announcement record mode, tone decoders 410 and 412 are preferably continuously generating tones and their outputs are fed to conventional analog gates 420 and 422, respectively, whose outputs are in turn fed to another conventional analog gate 424. When speaker signalling tones are to be recorded on the main channel, analog gate 420 is enabled and when speaker signalling tones are to be recorded on the auxiliary channel, analog gate 422 is enabled. The ring signal pulser switch 316 in conjunction with analog gate 424 preferably turns the selected trigger tone on and off at the desired signalling pulse rate, with the output of analog gate 424 preferably feeding the record/playback electronics 306 which input is summed with the announcement microphone 430 input.

The presently preferred telephone answering apparatus 300 of the present invention, as shown and preferred in FIG. 14, also provides for aborting the answering mode such as when an extension phone or a phone not near the answering machine or apparatus 300 is picked up during the auto answer process. Normally, the user would either shut the apparatus 300 off, wait for the outgoing message and recording interval to end, or allow the conversation to be recorded. However, with the apparatus 300 of the present invention, if the extension is picked up at a point remote from the location of the answering apparatus 300 in the home, and the answering party wishes to terminate the auto answer mode, the answering party merely need depress the hash tone key on the extension phone. When this is done, the hash tone is sent by the hash tone decoder 326 which consists of tone decoders 326a and 326b. These hash tone decoders, after sensing the presence of the hash tone, provide a signal via inverters 450 and 452 and AND gate 454 to turn on field effect transistor 456 which in turn operates the hang-up relay 458 which, thereafter, causes the apparatus 300 to operate as if the telephone was hung up thereby terminating the auto answer mode and permitting the answering party to speak to the caller.

In addition, as shown and preferred in FIG. 14, an auxiliary speaker 338 may be provided which can be located remotely from the telephone answering apparatus 300. When this auxiliary speaker 338 is connected to the telephone answering apparatus 300 via field effect transistor 460, normally closed switch 462 is opened which prevents the auxiliary signalling tone from appearing at the output of the internal speaker 314. It should be noted that only signalling frequencies which are triggered by tones recorded on the auxiliary channel can be heard via the auxiliary speaker 338.

By way of example, in tabular form, with the tables labeled A, B and C, I have illustrated the functional block activity for the multiple or alternate message capability of the answering apparatus 300 in table A, for the call screening capability of the apparatus 300 in Table B and for the night call screening capability of the apparatus 300 in Table C.

TABLE A

FUNCTIONAL BLOCK ACTIVITY FOR DIFFERENT ANSWERING MACHINE CAPABILITIES

| CAPABILITY | MODE | FUNCTIONAL BLOCK | | | | | COMMENT |
|---|---|---|---|---|---|---|---|
| | | RECORD/PLAYBACK ELECTRONICS | CODED NUMBER TONES DECODERS | CHANNEL SWITCHING LOGIC | GENERATORS/DECODERS FOR SPEAKER TRIGGER TONES | SIGNALLING SOUND GENERATOR | |
| Alternate Message Caller can receive alternate message if he/she depresses the predetermined number during the outgoing message period. | Announcement record process. | Internal microphone is used to record both main and alternate messages. "Main" message is recorded first. | No action. | Transfers record/playback electronics to feed auxiliary head. Switch over signal is developed by pushing "Actuate Alternate Channel" button. | No action | No action. | |
| | Auto answer process. | After receipt of ring, plays back main channel. If special number is pressed by caller, unit plays back alternate message. | Detects pressure of special number if it is present. If present, this block sends logic level to channel switching logic. | Switches input for main to auxiliary channel. After receipt of special number if activated. | No action. | No action. | |
| | | Main Channel | | | | | "Hello, you have reached the home of Kevin Jones. Nobody is available to answer right now, but if you leave you name and number, I'll get back to you as soon as possible." |
| | | Auxiliary Channel | | | | | "Hi honey, listen your father called and he wants to meet us at the Terrace in the Park Restaurant for dinner at 8 P.M. instead of 7 P.M. Let me know if that's OK." |
| | | | | | | | Information on Outgoing Message Tape |

TABLE B
FUNCTIONAL BLOCK ACTIVITY FOR
DIFFERENT ANSWERING MACHINE CAPABILITIES

| CAPABILITY | MODE | FUNCTIONAL BLOCK | | | | | COMMENT |
|---|---|---|---|---|---|---|---|
| | | RECORD/PLAYBACK ELECTRONICS | CODED NUMBER TONES DECODERS | CHANNEL SWITCHING LOGIC | GENERATORS/DECODERS FOR SPEAKER TRIGGER TONES | SIGNALLING SOUND GENERATOR | |
| Call Screening Caller can identify which party he/she would like to speak to. One party is identified by one type of signalling tone from the speaker, the other by a different signalling tone from the speaker. | Announcement record process. | Internal microphone is used to record main channel message. One internal generator is used to place speaker trigger tones on the main channel. The other internal generator is used to generate speaker trigger tones for the alternate channel. | No action. | Directs signal to be recorded onto either the main or auxiliary channel. Auxiliary channel is selected by pushing the "Activate Alternate Channel" button. A signal from the switching logic is used to select one of the two different trigger tones to be placed on the tape. | A sample of each of the two tone decoders is used to provide the trigger tone. These tones are the center frequencies of the same tone decoder used to determine that a trigger tone is present. The "Ring Signal Pulser" is depressed to gate the trigger tones. | No action. | |
| | Auto answer process. | After receipt of ring, plays back main channel. If special number is pressed by caller, unit plays back alternate message. | Detects presence of special number if it is present. If present, this block sends a logic level to the channel switching logic. | Input of record/playback electronics switches from main to auxiliary channel. After receipt of tones indicating that the special number was pressed on the caller's phone. | Decoders detect either the main channel trigger tone or the auxiliary channel trigger tone depending on which channel is activated. | If unit is on the main channel, the main channel trigger decoder is activated which in turn activates the main channel signalling frequency is heard from the internal speaker. If the unit is on the auxiliary channel the auxiliary channel signalling frequency is heard from the main speaker. | |

Main Channel

"You have reached the home of Mary and Jim Simon. If this call is for Jim, please hold for a moment. If this call is for Mary, push button #2 on your touch tone phone" . . . Speaker trigger signal for Jim's signalling tone . . . "I'm sorry Jim is not in right now. If you wish you may leave a message for Jim after the beep" . . . Beep tone.

Auxiliary Channel

Speaker trigger signal for Mary's signalling tone . . . I'm sorry Mary is not in right now but you can leave a message for her after you hear the beep" . . . Beep tone.

Information on Outgoing Message Tape

TABLE C
FUNCTIONAL BLOCK ACTIVITY FOR
DIFFERENT ANSWERING MACHINE CAPABILITIES

| CAPABILITY | MODE | FUNCTIONAL BLOCK | | | | | COMMENT |
|---|---|---|---|---|---|---|---|
| | | RECORD/PLAYBACK ELECTRONICS | CODED NUMBERS TONES DECODERS | CHANNEL SWITCHING LOGIC | GENERATORS/DECODERS FOR SPEAKER TRIGGER TONES | SIGNALLING SOUND GENERATOR | |
| Night Call Screening No ring is heard by the callee unless the caller depresses the predetermined special number on the touch tone pad. | Announcement record process. | Internal microphone is used to record main channel message. Internal generator is used to place speaker trigger tones on the activate channel. | No action. | Directs signal to be recorded onto either the main or auxiliary channel. Auxiliary channel is selected by pushing the "Activate Alternate Channel" button. A signal from the switching logic is used to select the trigger tones to be placed on the tape. | A sample of the trigger tone generator of the alternate channel is recorded onto the auxiliary channel. The "Ring Signal Pulser" is depressed to gate the trigger tones. | No action. | |
| | Auto answer process. | After receipt of ring, plays back main channel. If special number is pressed by caller, unit plays back the speaker trigger tone on the alternate channel. | Detects presence of special number if it is present. If present, this block sends a logic level to the channel switching logic. | Input of record/playback electronics switches from main to auxiliary channel. After receipt of tones indicating that the special number was pressed on the caller's phone. | Decoders detect the auxiliary channel speaker trigger tone. | If the unit is on the auxiliary channel, the auxiliary signalling frequency is heard from the main speaker. | |
| Main Channel | | | | "You have reached the home of Donald Peters. I am asleep right now but if you indicate my security code, I will be awakened in order to answer this call" ... "We are unable to ring through at this time. At the sound of the tone please leave your name and number". Beep ... Beep tone. | | | |
| Auxiliary Channel | | | | ... Speaker trigger tones. ... Beep tone. | | | |
| | | | | Information on Outgoing Message Tape | | | |

All of the above Tables A, B and C correspond to FIG. 13 and 14 with these Tables being more readily understood by reference to the functional block diagram of FIG. 13.

It is to be understood that the above described embodiments of the invention are merely illustrative of the principles thereof and that numerous modifications and embodiments of the invention may be derived within the spirit and scope thereof.

What is claimed is:

1. A multichannel interactive telephone answering apparatus adapted for use with a two-way telephone line after capture thereof for enabling interactive communication with a caller over said telephone line for enabling caller selectible interaction with said answering apparatus in response to designated arming signals provided by said caller, said apparatus comprising, a multichannel information storage means capable of retrievably storing information for enabling said interactive communication, said multichannel storage means comprising at least a main information channel and an auxiliary information channel and channel selection means for selectively switching at least between said main information channel and said auxiliary information channel, said channel selection means comprising signal detection means for detecting a designated arming signal provided by said caller over said captured telephone line and for providing an enable signal in response to detection of said designated arming signal, said channel selection means further comprising switching means responsive to said enable signal for providing said selective channel switching in response thereto, said multichannel information storage means further comprising playback means associated with each of said channels for providing selective playback of the information stored in said selected channel in response to said selection of a selected one of said channels, said selective playback providing said interactive communication, said multichannel storage means providing said playback from said main information channel in the absence of said detection of said designated arming signal, said multichannel information storage means comprising a multitrack magnetic storage medium for storing audio information thereon, said apparatus further comprising means for generating a different trigger signal to be stored on each of said main and auxiliary channels, and trigger signal detection means for detecting said trigger signal, said trigger signal detection means comprising means responsive to said trigger signal for generating a selective alert signal in response to caller provision of a predetermined designated arming signal, said selective alert signal corresponding to the person called, whereby interactive call screening and directing may be provided for uniquely alerting the person called.

2. A multichannel interactive telephone answering apparatus in accordance with claim 1 wherein said playback means comprises a magentic recording/playback head means, said magnetic recording/playback means comprising separate heads for said main and auxiliary channels.

3. A multichannel interactive telephone answering apparatus in accordance with claim 1 wherein said alert signal is a telephone ringing signal.

4. A multichannel interactive telephone answering apparatus in accordance with claim 3 wherein a plurality of telephone extensions connectable in connection to said telephone line are connectable to said trigger signal detection means, said selective alert signal selectively alerting a particular one of said telephone extensions.

5. A multichannel interactive telephone answering apparatus adapted for use with a two-way telephone line after capture thereof for enabling interactive communication with a caller over said telephone line for enabling caller selectible interaction with said answering apparatus in response to designated arming signals provided by said caller, said apparatus comprising, a multichannel information storage means capable of retrievably storing information for enabling said interactive communication, said multichannel storage means comprising at least a main information channel and an auxiliary information channel and channel selection means for selectively switching at least between said main information channel and said auxiliary information channel, said channel selection means comprising signal detection means for detecting a designated arming signal provided by said caller over said captured telephone line and for providing an enable signal in response to detection of said designated arming signal, said channel selection means further comprising switching means responsive to said enable signal for providing said selective channel switching in response thereto, said multichannel information storage means further comprising playback means associated with each of said channels for providing selective playback of the information stored in said selected channel in response to said selection of a selected one of said channels, said selective playback providing said interactive communication, said multichannel storage means providing said playback from said main information channel in the absence of said detection of said designated arming signal, said main channel and said auxiliary channel comprising selectable different messages for playback to said caller over said captured telephone line in response to said channel selection, said auxiliary channel selectable message being for a particular caller or caller group whereas said main channel selectable message being for all callers, said auxiliary channel selectable message being selectable only in response to caller provision of a predetermined designated arming signal, whereby an interactive private message capability is provided for said telephone answering apparatus.

6. A multichannel interactive telephone answering apparatus in accordance with claim 5 wherein said storage means further comprising recording means for recording messages from said caller on said selected channel.

7. A multichannel interactive telephone answering apparatus in accordance with claims 1 or 5 wherein said arming signals comprise telephone touch tone signals, said signal detection means comprising tone decoder means.

8. A multichannel interactive telephone answering apparatus in accordance with claim 7 wherein said tone decoder means comprises means for varying the detection frequency of said tone decoder means for changing the frequency to be detected of said designated arming signal to be detected, whereby the user of the apparatus may vary the arming signal to be provided by said caller.

9. A multichannel interactive telephone answering apparatus in accordance with claims 1 or 5 wherein said arming signals having an associated detection frequency, said signal detection means comprising means for detecting said associated detection frequency.

10. A multichannel interactive telephone answering apparatus in accordance with claim 9 wherein said frequency detection means comprises means for varying the detection frequency of said frequency detection means for changing the frequency to be detected of said designated arming signal to be detected, whereby the user of the apparatus may vary the arming signal to be provided by said caller.

11. A multichannel interactive telephone answering apparatus in accordance With claims 1 or 5 wherein said arming signals comprise pulse signals, said signal detection means comprising pulse detection means.

12. A multichannel interactive telephone answering apparatus in accordance with claim 11 wherein said pulse detection means comprises means for varying the pulses to be detected by said pulse detection means for changing the arming signal to be detected, whereby the user of the apparatus may vary the designated arming signal to be provided by said caller.

13. A multichannel interactive telephone answering apparatus in accordance with claims 1 or 5 wherein said signal detection means comprises voice recognition means, said designated arming signal comprising a voice recognition signal.

14. A multichannel interactive telephone answering apparatus adapted for use with a two-way telephone line after capture thereof for enabling interactive communication with a caller over said telephone line for enabling caller selectible interaction with said answering apparatus in response to designated arming signals provided by said caller, said apparatus comprising, a multichannel information storage means capable of retrievably storing information for enabling said interactive communication, said multichannel storage means comprising at least a main information channel and an auxiliary information channel and channel selection means for selectively switching at least between said main information channel and said auxiliary information channel, said channel selection means comprising signal detection means for detecting a designated arming signal provided by said caller over said captured telephone line and for providing an enable signal in response to detection of said designated arming signal, said channel selection means further comprising switching means responsive to said enable signal for providing said selective channel switching in response thereto, said multichannel information storage means further comprising playback means associated with each of said channels for providing selective playback of the information stored in said selected channel in response to said selection of a selected one of said channels, said selective playback providing said interactive communication, said multichannel storage means providing said playback from said main information channel in the absence of said detection of said designated arming signal, said multichannel information storage means comprising a multitrack magnetic storage medium for storing audio information thereon, said apparatus further comprising means for generating a trigger signal to be stored on one of said channels, and trigger signal detection means for detecting said trigger signal, said trigger signal detection means comprising means responsive to said trigger signal for generating a ringing signal for said called party only in response to caller provision of a predetermined designated arming signal, whereby call screening may be provided for only enabling selected calls to ring through.

* * * * *